(12) United States Patent
Freeman

(10) Patent No.: US 12,099,231 B2
(45) Date of Patent: Sep. 24, 2024

(54) USER INTERFACE WITH DISCRETE LIGHTING SECTIONS

(71) Applicant: Automated Pet Care Products, LLC, Auburn Hills, MI (US)

(72) Inventor: Adam Freeman, Oakland Township, MI (US)

(73) Assignee: Automated Pet Care Products, LLC, Auburn Hills, MI (US)

(*) Notice: Subject to any disclaimer, the term of this patent is extended or adjusted under 35 U.S.C. 154(b) by 0 days.

(21) Appl. No.: 18/312,731

(22) Filed: May 5, 2023

(65) Prior Publication Data
US 2023/0358946 A1     Nov. 9, 2023

Related U.S. Application Data

(60) Provisional application No. 63/339,763, filed on May 9, 2022.

(51) Int. Cl.
*F21V 8/00* (2006.01)
*A01K 1/01* (2006.01)

(52) U.S. Cl.
CPC ......... *G02B 6/0073* (2013.01); *G02B 6/0016* (2013.01); *G02B 6/0021* (2013.01); *G02B 6/0025* (2013.01); *G02B 6/0028* (2013.01); *A01K 1/0107* (2013.01)

(58) Field of Classification Search
CPC .. G02B 6/0073; G02B 6/0016; G02B 6/0021; G02B 6/0025; G02B 6/0028; A01K 1/0107
See application file for complete search history.

(56) References Cited

U.S. PATENT DOCUMENTS

| 4,096,827 A | 6/1978 | Cotter |
| 4,120,264 A | 10/1978 | Carter |
| 4,729,342 A | 3/1988 | Loctin |

(Continued)

FOREIGN PATENT DOCUMENTS

| CN | 104979375 A | 10/2015 |
| CN | 209314546 U | 8/2019 |

(Continued)

OTHER PUBLICATIONS

Aimicat available at https://aimicat.com/. As accessed on Sep. 9, 2020.

(Continued)

*Primary Examiner* — Mary Ellen Bowman
(74) *Attorney, Agent, or Firm* — The Dobrusin Law Firm, P.C.; Daniela M. Thompson-Walters

(57) ABSTRACT

A user interface including: a) one or more light guides, each light guide including: i) a rear wall; ii) an outer wall projecting from the rear wall; iii) one or more guide walls having opposing guide surfaces angled away from the rear wall; iv) a plurality of light pockets, each light pocket defined by the space between one or more guide walls, the outer wall, or any combination thereof; b) a plurality of light emitting devices, one or more light emitting devices residing within and/or aligned with the plurality of light pockets; and c) one or more diffusers located opposite the rear wall, the one or more diffusers distanced from the one or more guide walls such as to create a gap.

20 Claims, 16 Drawing Sheets

(56) References Cited

U.S. PATENT DOCUMENTS

| | | | |
|---|---|---|---|
| 4,886,014 A | 12/1989 | Sheriff | |
| 5,048,464 A | 9/1991 | Shirley | |
| 5,107,797 A | 4/1992 | LaRoche | |
| 5,458,090 A | 10/1995 | Favreau | |
| 5,477,812 A | 12/1995 | Walters | |
| 5,509,379 A | 4/1996 | Hoeschen | |
| 5,551,375 A | 9/1996 | Flores | |
| 5,622,140 A | 4/1997 | McIlnay-Moe | |
| 5,662,066 A | 9/1997 | Reitz | |
| 5,752,465 A | 5/1998 | Page | |
| 6,055,935 A | 5/2000 | Engel | |
| 6,082,302 A | 7/2000 | Thaler et al. | |
| 6,126,015 A | 10/2000 | Haymaker | |
| 6,463,881 B2 | 10/2002 | Reitz | |
| 6,851,386 B2 | 2/2005 | Northrop et al. | |
| 6,972,439 B1 | 12/2005 | Kim et al. | |
| 7,118,251 B1 | 10/2006 | Chambers et al. | |
| 7,137,355 B1 | 11/2006 | Wan | |
| 7,198,006 B2 | 4/2007 | Fischer | |
| 7,278,372 B2 | 10/2007 | Colsky | |
| 7,487,742 B2 | 2/2009 | Waters | |
| 7,647,889 B2 | 1/2010 | Horanoff | |
| 7,762,231 B2 | 7/2010 | Dugas et al. | |
| 7,798,101 B2 | 9/2010 | Waters | |
| 8,091,734 B2 | 1/2012 | Furner | |
| 8,413,608 B2 | 4/2013 | Sharp et al. | |
| 8,475,367 B1 | 7/2013 | Yuen et al. | |
| 8,485,131 B2 | 7/2013 | Veness | |
| 8,497,143 B2 | 7/2013 | Han | |
| 8,544,418 B2 | 10/2013 | Jiang et al. | |
| 8,757,094 B2 | 6/2014 | Baxter | |
| 8,963,188 B2 | 2/2015 | Park | |
| 9,178,123 B2 * | 11/2015 | Sakariya | H01L 33/06 |
| 9,433,185 B2 | 9/2016 | Baxter | |
| 9,504,228 B1 | 11/2016 | Egor et al. | |
| 9,565,830 B1 | 2/2017 | Caico | |
| 9,820,315 B2 | 11/2017 | Le Guen | |
| 10,098,315 B2 | 10/2018 | Couto | |
| 10,321,659 B1 | 6/2019 | Turner | |
| 10,467,879 B2 | 11/2019 | Stefanski | |
| 11,076,577 B1 | 8/2021 | Rotman | |
| 11,399,502 B2 | 8/2022 | Baxter | |
| 11,523,586 B2 | 12/2022 | Baxter | |
| 2002/0139312 A1 | 10/2002 | Reitz | |
| 2004/0080938 A1 * | 4/2004 | Holman | F21S 41/12 |
| | | | 362/245 |
| 2006/0196438 A1 | 9/2006 | Caputa et al. | |
| 2007/0227457 A1 | 10/2007 | Waters | |
| 2008/0017123 A1 | 1/2008 | Chin | |
| 2010/0232098 A1 * | 9/2010 | Chung | G02B 6/0073 |
| | | | 361/679.01 |
| 2011/0303156 A1 | 12/2011 | Sikka et al. | |
| 2013/0033625 A1 | 2/2013 | Kato | |
| 2013/0206075 A1 | 8/2013 | Huck | |
| 2013/0333625 A1 | 12/2013 | Baxter | |
| 2014/0060441 A1 | 3/2014 | Baxter | |
| 2014/0349061 A1 | 11/2014 | Sikka et al. | |
| 2014/0367705 A1 | 12/2014 | Bibl et al. | |
| 2016/0170389 A1 | 6/2016 | Im | |
| 2016/0294630 A1 | 10/2016 | Verma | |
| 2016/0334094 A1 * | 11/2016 | Bach | F24C 7/086 |
| 2017/0244574 A1 | 8/2017 | Moon | |
| 2018/0322405 A1 | 11/2018 | Fadell | |
| 2019/0113672 A1 * | 4/2019 | Sugiyama | G02F 1/133605 |
| 2019/0132396 A1 | 5/2019 | Finnegan | |
| 2019/0364840 A1 | 12/2019 | Baxter et al. | |
| 2020/0060221 A1 | 2/2020 | Fan et al. | |
| 2020/0112453 A1 | 4/2020 | Brown | |
| 2021/0007320 A1 | 1/2021 | Wu | |
| 2022/0125006 A1 | 4/2022 | Smith | |

FOREIGN PATENT DOCUMENTS

| | | |
|---|---|---|
| CN | 209518062 U | 10/2019 |
| CN | 209711057 U | 12/2019 |
| CN | 209732234 U | 12/2019 |
| CN | 109463289 A | 7/2021 |
| EP | 1625788 A1 | 2/2006 |
| EP | 2676543 B1 | 12/2018 |
| FR | 2687285 A1 | 8/1993 |
| FR | 3070822 A1 | 3/2019 |
| JP | 2008-211174 A | 9/2008 |
| WO | 1998/001374 A2 | 1/1998 |
| WO | 2002/054860 A1 | 7/2002 |
| WO | 2016/190765 A1 | 12/2016 |
| WO | 2020/043005 A1 | 3/2020 |
| WO | 2020/219849 A1 | 10/2020 |
| WO | 2022/087530 A1 | 4/2022 |
| WO | 2022/087531 A2 | 4/2022 |

OTHER PUBLICATIONS

Catgloo available at http://pethealthintec.com/. As accessed on Sep. 9, 2020.

Catlink available at https://en.xiaomitoday.it/catlink-automatic-litter-box-youth.html. As accessed on Sep. 9, 2020.

Circle Zero available at https://plutocirclezero.com/. As accessed on Sep. 9, 2020.

Igloo available at https://www.indiegogo.com/projects/igloo-reinvent-affordable-auto-cat-litter-box#/. As accessed on Sep. 9, 2020.

Meet available at https://www.slashpets.com/robotic-cat-litter-box/. As accessed on Sep. 9, 2020.

Petato Footloose available at https://www.kickstarter.com/projects/petato/footloose-next-gen-automatic-and-health-tracking-c. As accessed on Sep. 9, 2020.

Petree available at https://petreelitterboxes.com/. As accessed on Sep. 9, 2020.

* cited by examiner

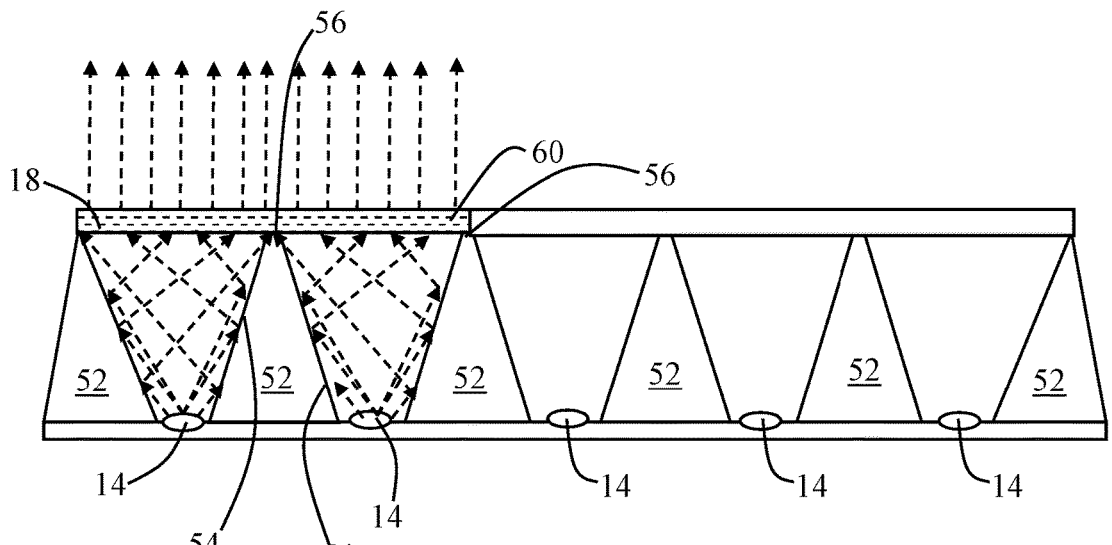
*FIG.-23*
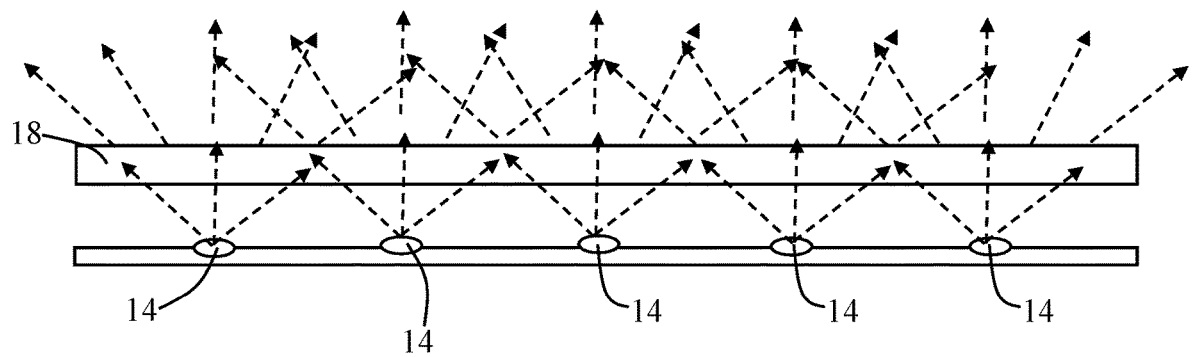
*FIG.-24 – Prior Art*
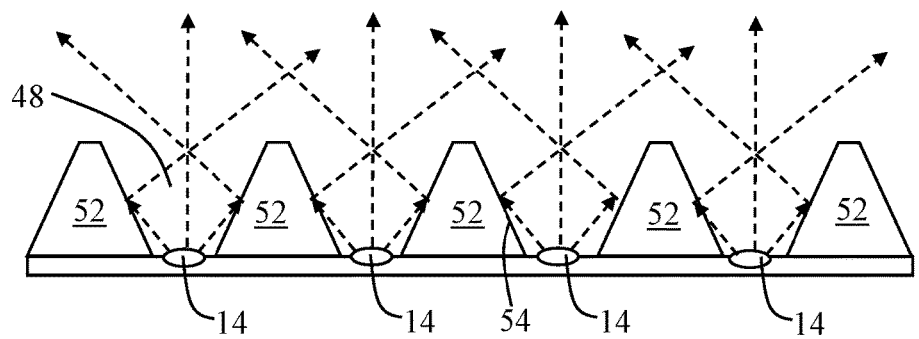
*FIG.-25 – Prior Art*

USER INTERFACE WITH DISCRETE LIGHTING SECTIONS

CROSS-REFERENCE TO RELATED APPLICATIONS

This application claims priority from U.S. Provisional Application No. 63/339,763, filed on May 9, 2022, and which is incorporated herein by reference in its entirety for all purposes.

FIELD

The present disclosure relates to a user interface. The user interface may find use with using light emitting devices and a lighting scheme to communicate one or more notifications to a user. The user interface may be particularly beneficial in preventing and/or reducing hot spots and cool spots, having the ability to mimic a continuous band of light while also having the ability to provide discrete lighting portions.

BACKGROUND

Automated litter devices seem to be trending toward digital and interactive displays. These displays can be more costly and have warranty is sues due to their complexity. There is a need to provide a simple user interface which is both aesthetically pleasing and easily communicates a status of a litter device to a user.

Control panels, user interfaces, or even just lighting systems which rely on light emitting diodes often run into issues with hot spots and cold spots. Hot spots are areas of high intensity while cold spots are areas of low intensity. These are typically resolved with the use of a diffuser. A diffuser is usually beneficial in creating a more uniform light spread, eliminating hot spots, creating less diode reflection on surfaces, all while providing an aesthetically pleasing surface. The challenge is that in creating a uniform light spread, the light emitted from different diodes overlaps with one another and causes the light to blend. This can be positive for those looking for a uniform, continuous band of light, but is a challenge for those who want to utilize the light emitting diodes on a more individual basis.

Thus, what is needed is a means to have both a continuous, uniform light spread while also allowing for discrete portions of light which do not overlap with one another. What is needed is a means to integrate a user interface into a litter device while avoiding the use of graphic displays.

SUMMARY

The present disclosure relates to a user interface including: a) one or more light guides, each light guide including: i) a rear wall; ii) an outer wall projecting from the rear wall; iii) one or more guide walls having opposing guide surfaces angled away from the rear wall; iv) a plurality of light pockets, each light pocket defined by the space between one or more guide walls, the outer wall, or any combination thereof; b) a plurality of light emitting devices, one or more light emitting devices residing within and/or aligned with the plurality of light pockets; and c) one or more diffusers located opposite the rear wall, the one or more diffusers distanced from the one or more guide walls such as to create a gap.

The present disclosure provides for a user interface in which discrete light sections are created by light pockets of a light guide and a diffuser. Light is deflected by one or more guide walls to aid in spreading of the emitted light. This light is then further diffused by a diffuser to provide for a uniform light spread. The guide walls also aide in creating discrete light sections. The angle of the guide walls provides for the light to be deflected and/or reflected from one light pocket such that it minimally or does not overlap with light from another light pocket.

BRIEF DESCRIPTION OF THE DRAWINGS

FIG. 23 is a cross-section view of light emitting through a light guide and diffuser.
FIG. 24 illustrates a diffuser of the prior art.
FIG. 25 illustrates light pockets of the prior art.

DETAILED DESCRIPTION

Figure 1:
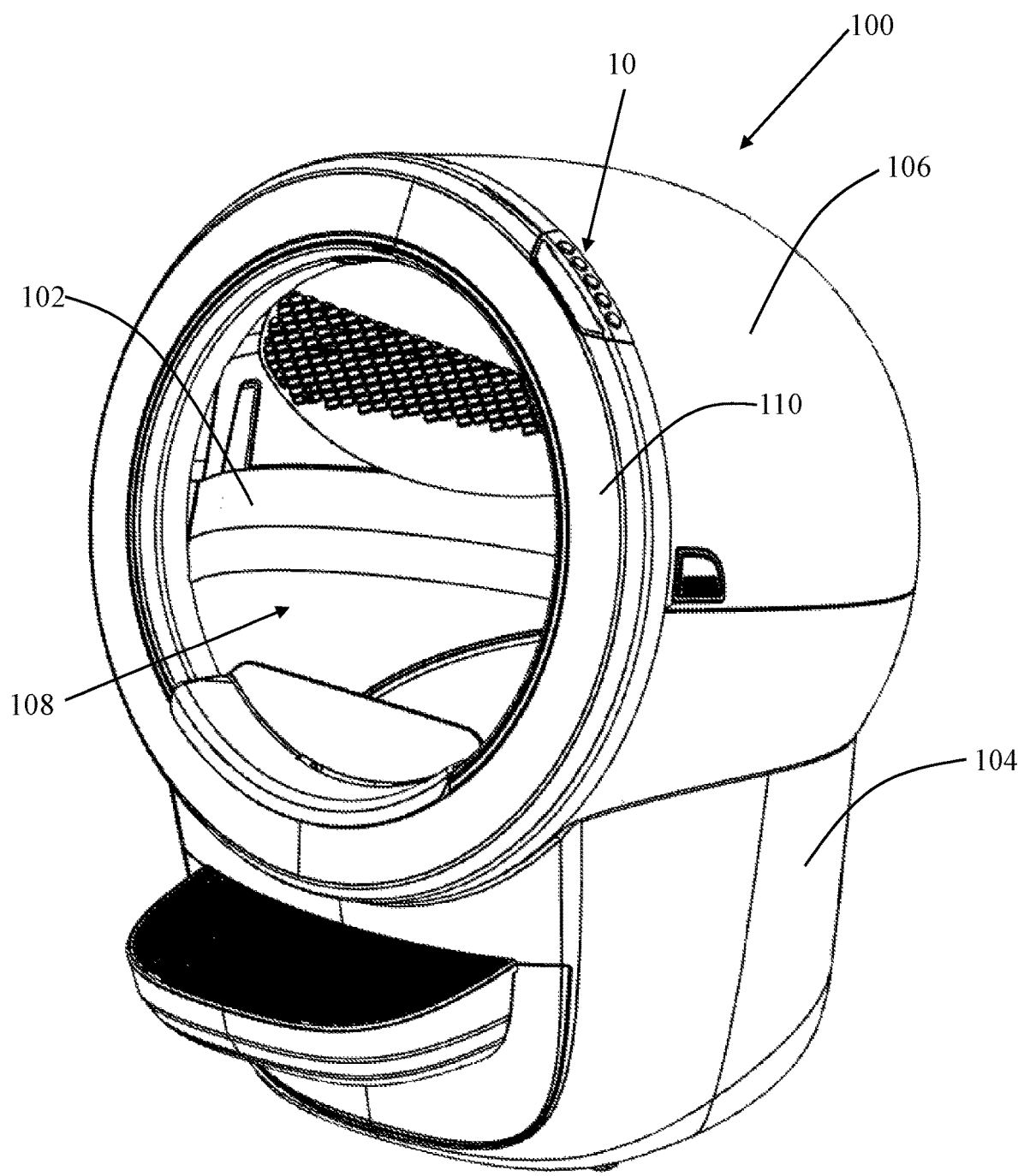
FIG. 1 is a perspective view of a litter device with a user interface.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

User Interface

The present disclosure may relate to a user interface. The user interface may function to receive one or more user inputs, relay one or more outputs (e.g., notifications), or both. The user interface may function to cooperate with and/or be affixed to one or more consumer products. One or more consumer products may include any electronic device that may benefit from receiving user inputs, displaying one or more outputs, or both. Electronic devices may include one or more smart home units (e.g., thermostat, speaker, display, etc.), pet care devices (e.g., litter device, feeder, water dispenser, scale), infotainment units (e.g., in vehicle infotainment and/or lighting), communication devices (e.g., mobile phones, desk phones, tablets, desktops), the like, or any combination thereof. Some of the teachings herein may be compatible with uses beyond consumer products. For example, the light guide and diffuser configuration may be compatible with vehicle lighting, residential lighting, landscape lighting, and the like. The user interface may include one or more circuit boards, fasteners, light emitting devices, light guides, diffusers, trim covers, buttons, button bars, button carriers, the like, or any combination thereof. A user interface compatible with a litter device may be affixed to a housing, exterior, or both. An exterior may include a bezel, bonnet, base, and/or the like. A user interface may be part of and/or affixed to a bezel of a litter device.

The user interface may include and/or be affixed to a circuit board. A circuit board may function to retain and/or house one or more electrical components, retain one or more light emitting devices, and/or cooperate with one or more components of the user interface to secure one or more components together. A circuit board may have any size and/or shape for being affixed to and/or retained with one or more consumer products. A circuit board may have a two-dimensional cross-sectional shape which is partially or completely an annulus, square, rectangular, circular, ovular, triangular, the like, or any combination thereof. A circuit board may have a size and/or shape reciprocal with a component in which it is housed. For example, a circuit board may be a portion of an annulus (e.g., arcuate). The shape may allow for a circuit board to reside within a bezel. The circuit board may include one or more fastener openings. The one or more fastener openings may allow for one or more fasteners to pass therethrough; the circuit board be mounted to one or more components, or any combination thereof. The circuit board may house one or more light emitting devices, have one or more openings for one or more light emitting devices to reside therein, or both.

The user interface may include one or more light emitting devices. The one or more light emitting devices may function to emit light, illuminate a user interface, communicate one or more outputs (e.g., notifications) to a user, or any combination thereof. The one or more light emitting devices may be any type of device capable of emitting light. The one or more light emitting devices may be capable of emitting a single color of light or a plurality of colors. A plurality of colors may be beneficial in being able to provide for a multitude of lighting combinations which correlate to different notifications. The one or more light emitting devices may include one or more light emitting diodes. The one or more light emitting devices may reside and/or be affixed to a circuit board, within one or more openings of a circuit board, or both. The one or more light emitting devices may be aligned with one or more light guides, reside within one or more light pockets, be aligned with one or more light openings, the like, or any combination thereof.

The user interface may include one or more light guides. The one or more light guides may function to guide array(s) of light emitted from one or more light emitting devices, cooperate with one or more diffusers, create one or more discrete light sections, reduce and/or prevent hot spots, reduce and/or prevent cold spots, minimize and/or prevent overlapping light from different light emitting devices, or any combination thereof. The one or more light guides include an outer wall. The outer wall may define the periphery of the light guide. The one or more light guides may include a rear wall. The rear wall may function as a base of the light guide. The rear wall has the outer wall projecting therefrom. The rear wall may include one or more light openings formed therein. The light openings may allow for the light guide to be aligned with one or more light emitting devices and have light be emitted into one or more light pockets. As an alternative, one or more light emitting devices may be affixed to a rear wall of the light guide such as to reside in the one or more light pockets. The one or more light guides may include one or more light pockets. The one or more light pockets may each function to guide deflection of light emitted from one or more light emitting devices. The one or more light pockets may have a three-dimensional shape which is substantially similar to one or more one or more cones, tetrahedrons, prisms, cubes, cylinders, cuboids, pyramids, the like, or a combination thereof. The one or more light pockets may have a three-dimensional shape which widens from the rear wall to the front facing side of a light guide. By widening from the rear to the front, the light pocket is able to deflect and/or reflect light to aid in spreading the emitted light.

The one or more light pockets may be defined by one or more guide walls, the outer wall, or both. The one or more guide walls may be formed as protrusions projecting into an interior of the light guide (i.e., within the outer wall), projections from the rear wall, bosses from the rear wall, the like, or any combination thereof. The one or more guide walls may be evenly or unevenly spaced within the light guide. The space between two guide walls may be defined as a light pocket. The one or more guide walls may be shaped to provide a tapered shape of a light pocket. The one or more guide walls may have a three-dimensional shape similar to a triangular prism, pyramid, cone, cube, cuboid, cylinder, the like, or any combination thereof. Each guide wall may include two opposing guide surfaces. The opposing guide surfaces may function to deflect light from the one or more light emitting devices. The guide surfaces may taper toward the front of the light guide, angle toward one another, be joined together at an outer surface of the guide wall, or any combination thereof.

The one or more guide walls may be angled from one or more rear walls. The angle may allow for light to be deflected, light to be better distributed to provide for a uniform spread, or both. The angle may cooperate with one or more gaps, diffusers, or both to create a uniform band of light and discrete light sections. The angle may be measured as the angle formed between one or more rear walls and one or more guide surfaces. The angle may be the angle within the light pocket as opposed to the angle within the guide wall. The angle may be about perpendicular, obtuse, or both. An obtuse angle may be advantageous for deflecting light from a light emitting device. The angle may be about 90 degrees or greater, about 100 degrees or greater, about 110 degrees or greater. The angle may be about 150 degrees or less, about 140 degrees or less, about 130 degrees or less, or even about 120 degrees or less. The angle may be between about 100 degrees and about 130 degrees. The angle may be between about 110 degrees and about 120 degrees.

The one or more guide walls may form a gap with a diffuser. The gap may cooperate with the guide walls and the diffuser to allow for a continuous band of light to be formed while also allowing for discrete light sections to be formed. The gap may allow for a small portion of the deflected and/or emitted light to pass therethrough from one light pocket with minimal and/or no overlap with the emitted and/or deflected light from an adjacent light pocket. In such manner, the emitted light from one light pocket is distributed and/or spread out such as to be adjacent to and not overlap with emitted light from an adjacent light pocket. The gap may be formed between the apex of a guide wall, an outer surface of a guide wall, or both and an interior surface of a diffuser. A height of the gap may be the distance between the outer surface of the guide wall and the interior surface of a diffuser. The height of the gap may be correlated to a height of a guide wall. A height of a guide wall may be a distance from the rear wall to the outer surface of the guide wall. The height of the gap may be about 1% or greater, about 5% or greater, about 7% or greater, or even about 10% or greater relative to the height of the guide wall. The height of the gap may be about 25% or less, about 20% or less, or even about 15% or less relative to the height of the guide wall.

The user interface may include one or more diffusers. The one or more diffusers may function to create a uniform light spread, eliminate and/or reduce hot spots, eliminate and/or reduce cold spots, create less reflection, protect the light guide and/or light emitting devices, provide a cleanable surface, or any combination thereof. One or more diffusers may be affixed to a trim cover, reside within an opening (e.g., window) of a trim cover, be adjacent to a light guide, be affixed to a light guide, or both. The one or more diffusers may be located opposite one or more light emitting devices, one or more rear walls, or both of a light guide. The one or more diffusers may have a shape reciprocal with a shape of a product and/or portion of a product to which it is affixed to. A diffuser may have a two-dimensional cross-sectional shape which is partially or completely an annulus, square, rectangle, circle, oval, triangle, the like, or any combination thereof. A diffuser may have a size and/or shape reciprocal with a component in which it is housed and/or affixed. For example, a diffuser may be a portion of an annulus (e.g., arcuate). A diffuser may be transparent, opaque, frosted, or any combination thereof. A diffuser may be formed of one or more materials having one or more particles embedded therein. The particles may function to help disperse the light, cooperate with a transparent material to form an opaque and/or frosted surface, or both.

Integration of User Interface into Litter Device

The present teachings relate to a device that includes litter for use by an animal. The device may be a litter device. The litter device may be an automated litter device. The device may function to retain litter, sort used litter from unused litter, collect animal waste, remove animal waste, divide animal waste from litter, temporarily store animal waste, or any combination thereof. The device may have the ability to replace used litter with unused litter. The device may be useful to one or more domesticated animals. One or more domesticated animals may include one or more cats, rabbits, ferrets, pigs, dogs, ducks, goats, foxes, the like, or any combination thereof. The device may be compatible with one or more types of litter. One or more types of litter may include clumping clay, non-clumping clay, silica gel crystals, recycled paper, pine, corn wheat, walnut shells, the like, or any combination thereof. The litter device may include a base, chamber, bonnet, waste drawer, bezel, one or more accessories, one or more sensors, filtering system, storage unit, the like, or any combination thereof.

The litter device includes a chamber. The chamber may function to house clean litter, provide a space for an animal to enter and excrete waste, or both. The chamber may have any size and shape which is able to retain sufficient litter for an animal to use during waste elimination, allow for an animal to comfortably use the litter box, or both. The chamber may have a three-dimensional shape which is substantially spherical, ovoidal, cylindrical, cuboidal, conical, pyramidical, the like, or any combination thereof. A shape which is substantially spherical, ovoidal, cylindrical, and/or the like may be beneficial in providing for rotation of the chamber during a cleaning cycle, avoiding litter and/or waste from collecting along one or more vertices, or a combination thereof. For example, the chamber may be shaped like a globe, sphere, football, egg, the like, or a combination thereof. The chamber may be configured to retain litter. The chamber may be supported by a base. The chamber may be capable of rotation during a cleaning cycle. The chamber may be rotatably supported by a base. The base may be located between the chamber and a surface upon which the litter device rests. The chamber may have a generally hollow interior to accommodate one or more septums, liners, litter, and the like. The chamber may include an entry opening, waste opening, or both. The chamber may have a generally hollow interior to accommodate one or more animals during use. The chamber may have a size which is able to accommodate one or more animals which are about 1 kg or greater, about 2 kg or greater, about 4 kg or greater, about 8 kg or greater, or even about 10 kg or greater. The chamber may have a size which is able to accommodate one or more animals which are about 30 kg or less, about 25 kg or less, about 20 kg or less, or even about 15 kg or less. The hollow interior may form a volume of the chamber. The volume of the chamber may be about 16,000 $cm^3$ or greater, about 32,500 $cm^3$ or greater, or even about 65,000 $cm^3$ or greater. The volume of the chamber may be about 150,000 $cm^3$ or less, about 100,000 $cm^3$ or less, about 85,000 $cm^3$ or less, or even about 75,000 $cm^3$ or less. The chamber may have a volume that is usable by an animal which can fit through an entry opening. The usable volume may be any volume such that the chamber may be used by an animal to excrete waste. The usable volume may be any volume such that an animal can enter, turn, and move around within the chamber. The volume of the chamber may be the usable volume, the total volume, or both. The usable volume may be the volume within the hollow interior of the chamber minus the volume occupied by litter and any components internally located within the chamber. The total volume may be the actual volume of the hollow interior of the chamber. The chamber may be formed by a single piece or a plurality of pieces. The chamber may include one or more filter systems affixed thereto, in fluid communication therewith, or both. The chamber may be formed by a single piece having a substantially spherical shape. The chamber may be formed by two or more pieces which mate to form a substantially spherical shape. The chamber may be formed by an upper chamber and a lower chamber.

The chamber may include an axis of rotation. The axis of rotation may function as the relative axis about which the chamber rotates during one or more cleaning cycles. The axis of rotation may have any orientation such that the usable volume of a chamber is increased; the litter relative to the chamber has a conical rotation; litter is funneled toward a rear of the chamber (e.g., away from the front opening), toward and through a screen and/or septum, or both; a larger entry opening may be used without litter spilling therefrom; a screen and/or septum can be located further back in the chamber creating more internal space; or any combination thereof. The axis of rotation of the chamber may form an angle with a vertical plane, horizontal plane, or both. A vertical plane may be substantially in the direction of gravity, parallel to gravity, or both. A horizontal plane may be substantially perpendicular to a direction of gravity, parallel to a surface upon which the litter device rests, or both. The axis of rotation of the chamber may form any angle with a vertical plane, horizontal plane, or both so that one or more of the teachings herein are achieved. The axis of rotation may form an angle of about 88 degrees or less, about 85 degrees or less, about 80 degrees or less, about 75 degrees or less, or even about 70 degrees or less with a vertical plane. The axis of rotation may form an angle of about 40 degrees or greater, about 45 degrees or greater, about 50 degrees or greater, about 55 degrees or greater, about 60 degrees or greater, or even about 65 degrees or greater with a vertical plane. The axis of rotation may form an angle of about 40 degrees to about 88 degrees, of about 55 degrees to about 80 degrees, of about 40 degrees to about 85 degrees, or even about 60 degrees to about 75 degrees with a vertical plane. The axis of rotation may form an angle with the horizontal plane that is complementary to the angle relative to the vertical plane. The angled axis of rotation may funnel clumps of waste and/or litter, waste, or both toward a common location. The common location may be located toward a rear, bottom, or both of the chamber. The common location may be a septum, screen, waste opening, waste bin, or any combination thereof. The axis of rotation may allow for a single waste opening to be used, waste to be funneled toward the waste opening, waste to transfer for the waste opening to a waste bin, or any combination thereof.

The chamber includes an entry opening. The entry opening allows for one or more animals to comfortably enter and exit the chamber. The entry opening may be any size and shape so that one or more animals may enter and exit the chamber. The entry opening may be any size and shape so that during entry, use, and/or exiting by an animal; during one or more cleaning cycles; or any combination thereof litter is substantially maintained within the chamber. The entry opening may have a profile shape and/or cross-section which is substantially circular, ovular, elliptical, square, rectangular, trapezoidal, triangular, rhombus, the like, or any combination thereof. The profile shape may be a shape looking at an opening plane straight on, perpendicular, or both. The entry opening may have a profile shape which is symmetrical, non-symmetrical, or both. An entry opening which is circular, ovular, or the like may offer a more comfortable and larger entry area, may avoid sharp vertices that may scratch an animal, may avoid sharp vertices which may catch litter upon exit of the animal from the chamber, or a combination thereof.

The litter device may include a bezel. The bezel may function to define the entry opening, provide an aesthetic appearance of a front of the litter device, maintain litter within the chamber, seal off any joints along the front of the device from litter, seal off any pinch points at and/or around the entry opening, house one or more sensors, house one or more control panels, removably retain one or more accessories, the like, or any combination thereof. The bezel may have any shape, size, and/or form such the bezel may be able to provide a barrier for litter and/or other waste remnants while not interfering with entry and egress of an animal from the chamber. The bezel may have any size and/or shape for defining and/or encircling an entry opening. The bezel may have a shape substantially reciprocal, similar, and/or same as the entry opening. The bezel may have a shape reciprocal, similar, and/or partially the same as one or more accessories, mounting brackets of an accessory, or both. The bezel may have a substantially circular and/or oval cross-sectional shape with an opening therein. The bezel may have a shape which is substantially annular. The opening may define part of the entry opening and have similar and/or the same dimensions as suitable for the entry opening. The bezel may have a shape and size so as to conceal one or more rims, edges, or both of a bonnet, base frame, chamber, or a combination thereof. The bezel may have a shape and size so as to conceal the space between a chamber and bonnet, chamber and base frame, or both. The bezel may include one or more surfaces, such as one or more front surfaces, flanges, mating features, openings (e.g., entry opening), the like, or any combination thereof.

The chamber includes one or more waste openings. The one or more waste openings may function to allow waste, used litter, or both to transfer from the chamber into the base, waste bin, or both. The waste opening may be at any location in the chamber so that the waste, used litter, or both may transfer from the chamber into a waste bin. The waste opening may be at any location in the chamber that aligns with the waste bin during a cleaning cycle, off-set from the waste bin while in a home position, or both. The waste opening may be formed as an aperture in an upper chamber, lower chamber, or both. For example, the waste opening may be formed as an aperture in the upper chamber such that it resides substantially opposite the waste bin while the chamber is in a home position. The waste opening may have any shape suitable for allowing waste to quickly transfer from the chamber to the waste drawer during a cleaning cycle. The waste opening may have a cross-sectional shape which is substantially circular, ovular, square, rectangular, trapezoidal, triangular, rhombus, the like, or any combination thereof. The waste opening may have a shape which is reciprocal with a cross-sectional shape of the waste bin. The waste opening may be located partially or completely on one side of a longitudinal plane of the device. The longitudinal plane may intersect the rotational axis, vertical plane, horizontal plane, or a combination thereof. The rotational axis, vertical plane, or both may be parallel to, lie within, or both to the longitudinal plane. The horizontal plane may be substantially perpendicular to the longitudinal plane. The longitudinal plane may divide the litter device into side halves. The side halves may each comprise a portion of the bonnet, chamber, and base. The side halves may be substantially symmetrical and/or mirrored about the longitudinal plane. Substantially symmetrical halves may still allow for certain features to be only located on one side of the device, such as a waste opening. A center of the waste opening may be offset from the longitudinal axis by an angle. A center of the waste opening may be angled from the longitudinal plane by about 0° or more, about 5° or more, about 10° or more, about 15° or more, or even about 20° or more. A center of the waste opening may be angled from the longitudinal plane by about 45° or less, about 35° or less, about 30° or less, or even about 25° or less. The angle may be measured when a chamber is in a home position. The waste opening may be located on one or more sides of a track. The waste opening may be located between an entry opening and a track. The waste opening while the chamber is in a home position, may not overlap with the waste bin. The waste opening, during a cleaning cycle, may substantially align, overlap, or both with a waste bin. The waste opening, during a cleaning cycle, may be rotated about the rotational axis. The waste opening, during a cleaning cycle, may rotate from a home position to an emptying position, a home position, any position therebetween, or a combination thereof. The emptying position may be when the chamber is rotated such that the waste opening is located adjacent to, overlapping with, substantially centered with, or a combination thereof the waste bin. The waste opening, during a cleaning cycle, may rotate by an angle of about 130° or greater, about 145° or greater, about 150° or greater, about 155° or greater, or even about 160° or greater to an emptying position. The waste opening, during a cleaning cycle, may rotate by an angle of about 230° or less, about 220° or less, about 200° or less, or even about 180° or less to an emptying position. The waste opening may rotate a complete revolution (e.g., 360°) from the start of a cleaning cycle to the end of a cleaning cycle. Rotation of the waste opening may occur when a track is rotated. Rotation of a track may rotate the chamber and the waste opening.

The chamber may include a rotation device. The rotation device may function to rotate the chamber about a rotational axis, rotate the chamber during a cleaning cycle, or both. The rotation device may be a track, gear, high friction surface, raised area, toothed area, contact surface area, the like, or a combination thereof. The rotation device may be affixed to, integral with, in rotational communication with, or a combination thereof the chamber. The rotation device may be located on an exterior, interior, or both of the chamber. The rotation device may be a belt, a cog, a sprocket, a toothed assembly, rollers, a wheel, the like, or a combination thereof. The chamber may include a track about at least a portion of an exterior of the chamber. The base may include one or more drive sources in rotational communication with and which drives the rotation device.

The litter device includes a base. The base may function to support a chamber, house a waste drawer, house one or more electrical components, or any combination thereof. The base may have any size and shape so that the base may support the chamber, house a waste drawer, and/or house one or more electrical components. The base may rotatably support the chamber. The base may allow the chamber to rotate during one or more cleaning cycles. The base may be configured to rest on a surface. A surface may be any suitable surface for having a litter device resting thereon. The surface may be a floor, table, platform, substantially planar surface, or any combination thereof. The base may include one or more base frames, waste drawers, drawer cavities, chamber supports, steps, electrical components, ports, filters, the like, or any combination thereof.

The disclosures of U.S. patent application Ser. Nos. 13/804,370; 16/428,433; 17/605,704; and 17/509,866 and International Application Nos: PCT/US2021/0564 and PCT/US2021/056491 are incorporated herein by reference for all purposes. As can be seen, the user interface of the present teachings may be compatible with these disclosures. For example, the user interface may be integrated with the bezel, bonnet, and/or base; in electrical communication with one or more sensors, communication modules, controllers, and/or the like; one or more notifications of the user interface may be one or more notifications from one or more sensor inputs and/or signals; the like; or any combination thereof.

Illustrative Examples

FIG. 1 illustrates a litter device 100. The litter device 100 includes a chamber 102. The chamber 102 is rotatably supported by a base 104. The chamber 102 is partially covered by a bonnet 106. The litter device 100 includes an entry opening 108. The entry opening 108 leads into the chamber 102. The entry opening 108 is surrounded by a bezel 110. The litter device 100 includes a user interface 10.

Figure 2:
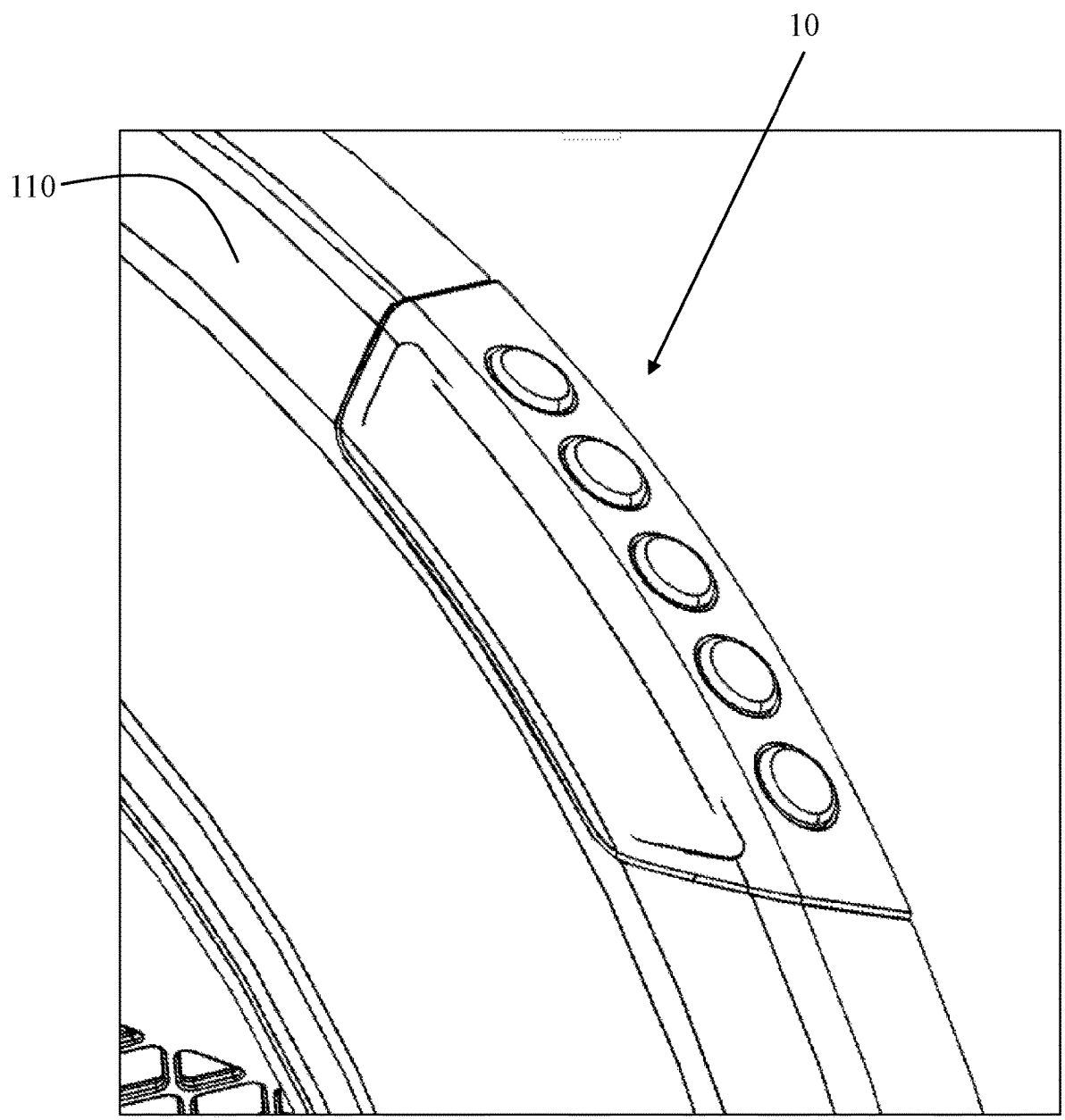
FIG. 2 is a close-up view of a user interface of a litter device.

FIG. 2 illustrates a close-up view of a user interface 10 affixed to bezel 110.

Figure 3:
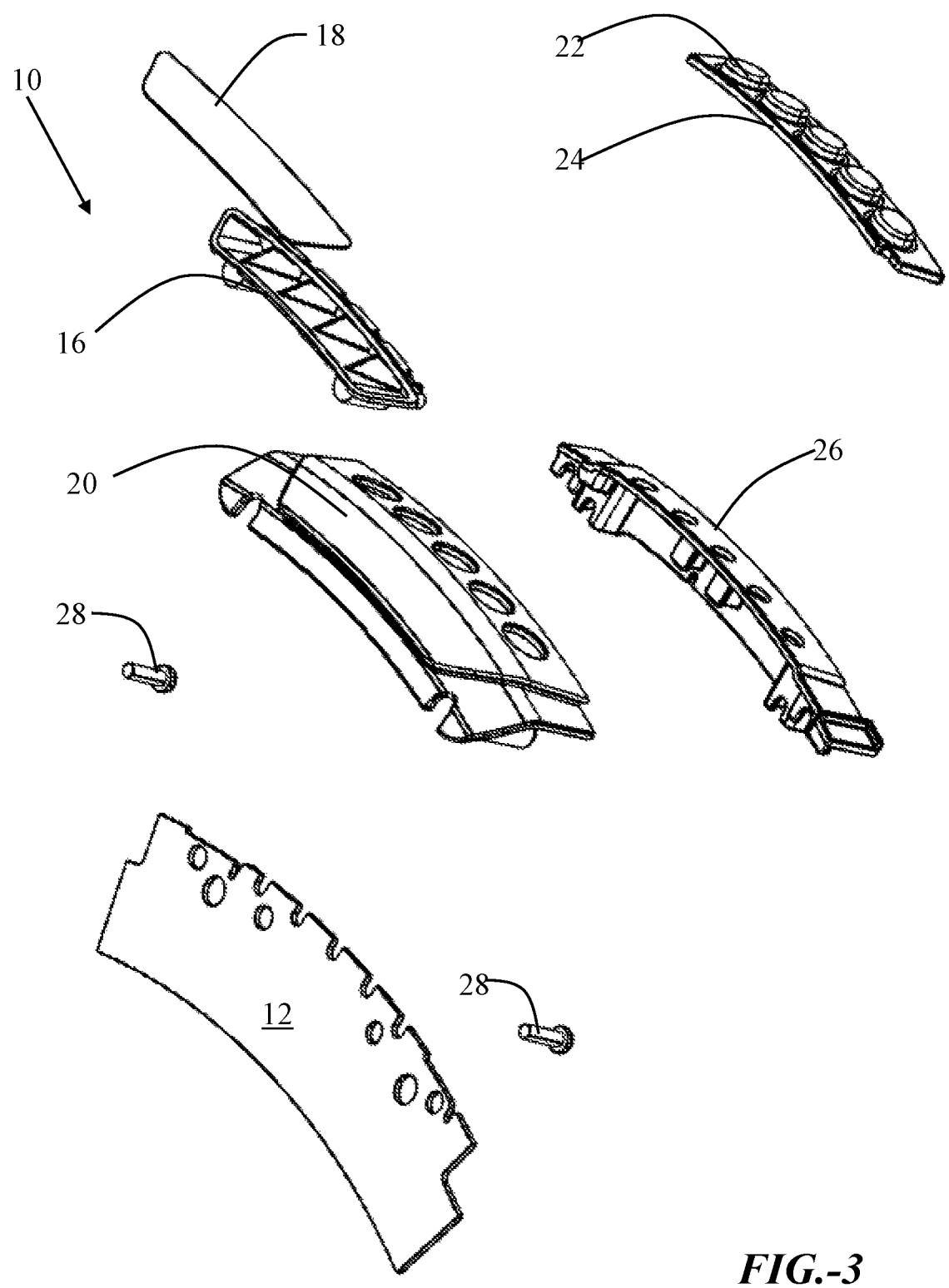
FIG. 3 is an exploded view of a user interface.

FIG. 3 illustrates an exploded view of the user interface 10. The user interface 10 is affixed to a circuit board 12. The circuit board 12 may include a plurality of light emitting devices 14 (not shown). The light emitting devices 14 may include a plurality of LED lights (not shown). Affixed to the circuit board 12 is a light guide 16. The light guide 16 is affixed via fasteners 28. The light guide 16 is aligned with the light emitting device 14 (not shown). Resting on the light guide 16 is a diffuser 18. The diffuser 18 rests within a trim cover 20. Projecting through the trim cover 20 are a plurality of buttons 22. The plurality of buttons 22 are retained on a button bar 24. The button bar 24 is sandwiched between the trim cover 20 and button carrier 26.

Figure 4:
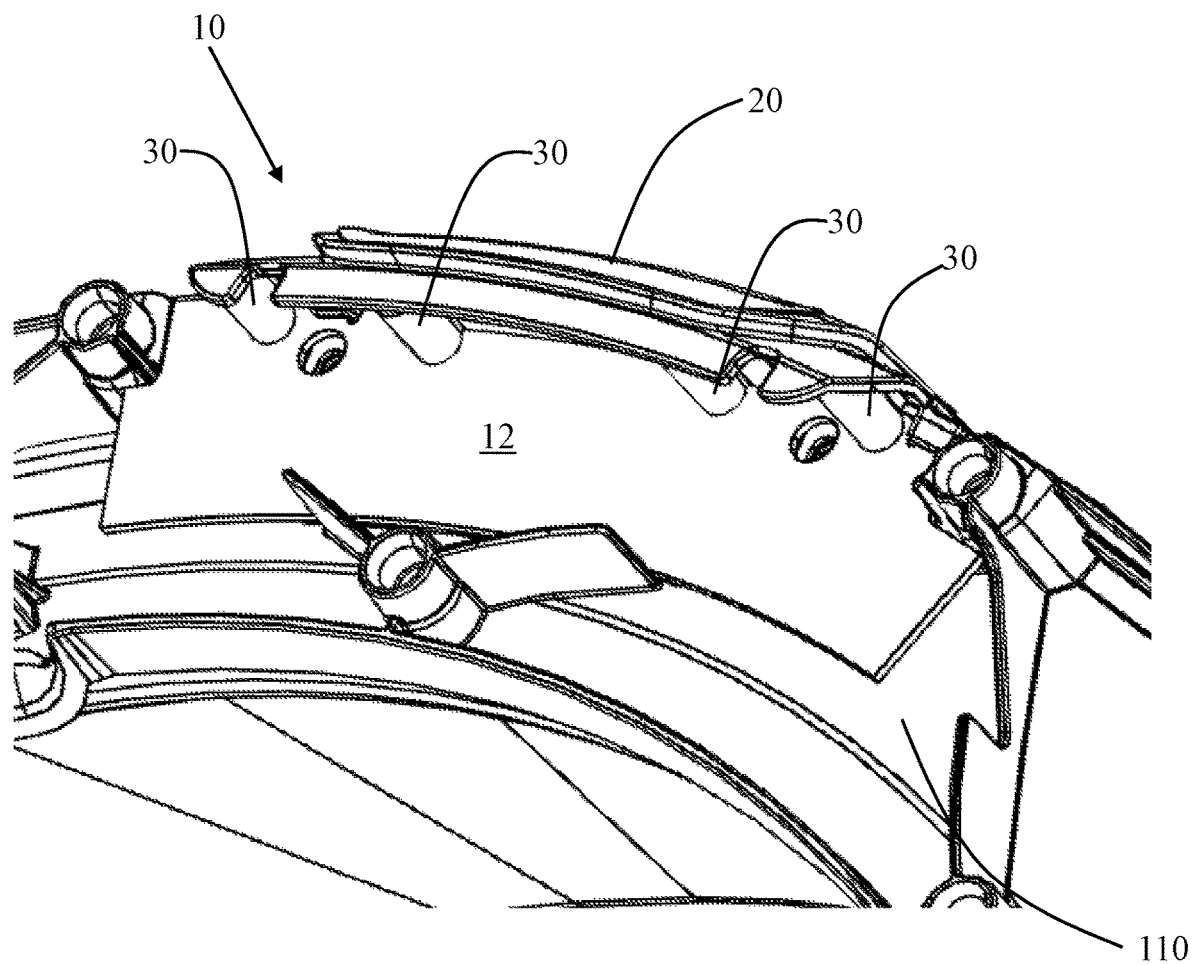
FIG. 4 illustrates a user interface affixed to a circuit board.

FIG. 4 illustrates the user interface 10 affixed to the circuit board 12. An outer cover (not shown) of the bezel 110 is removed such as to expose the circuit board 12. The light guide 16 includes bosses 30. The fasteners 28 (not shown) pass through openings (not shown) of the circuit board 12 and engage with an interior of the bosses 30. The trim cover 20 is also affixed to the circuit board 12. The trim cover 20 includes bosses 30.

Figure 5:
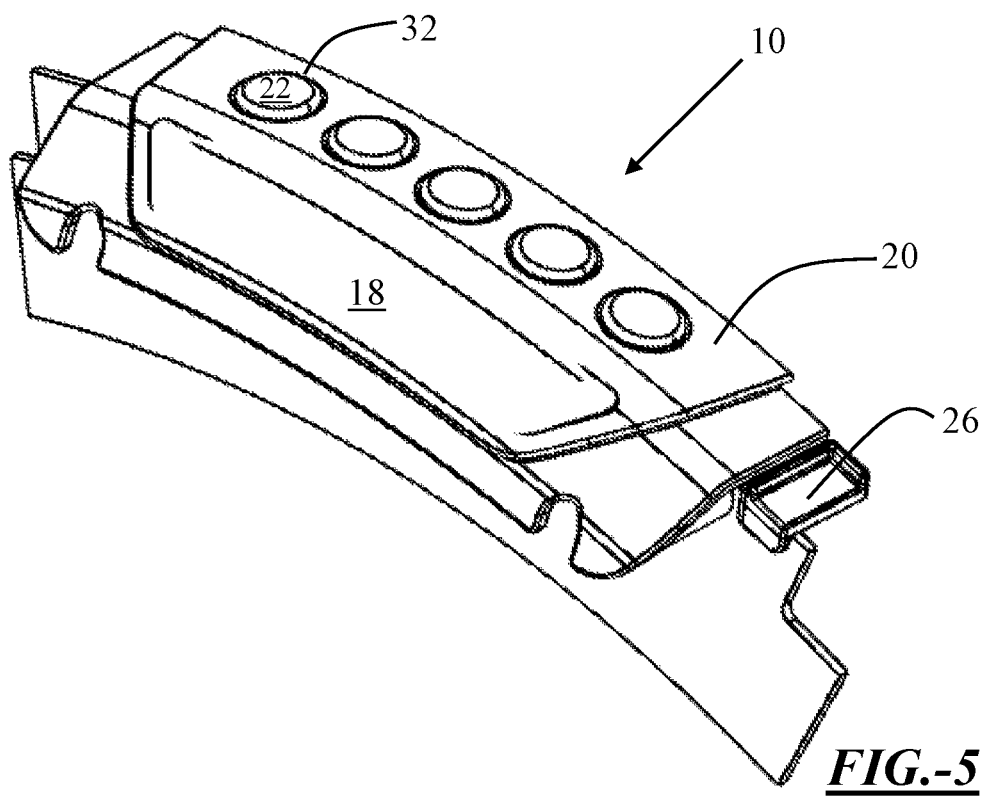
FIG. 5 is a front perspective view of a user interface.
Figure 6:
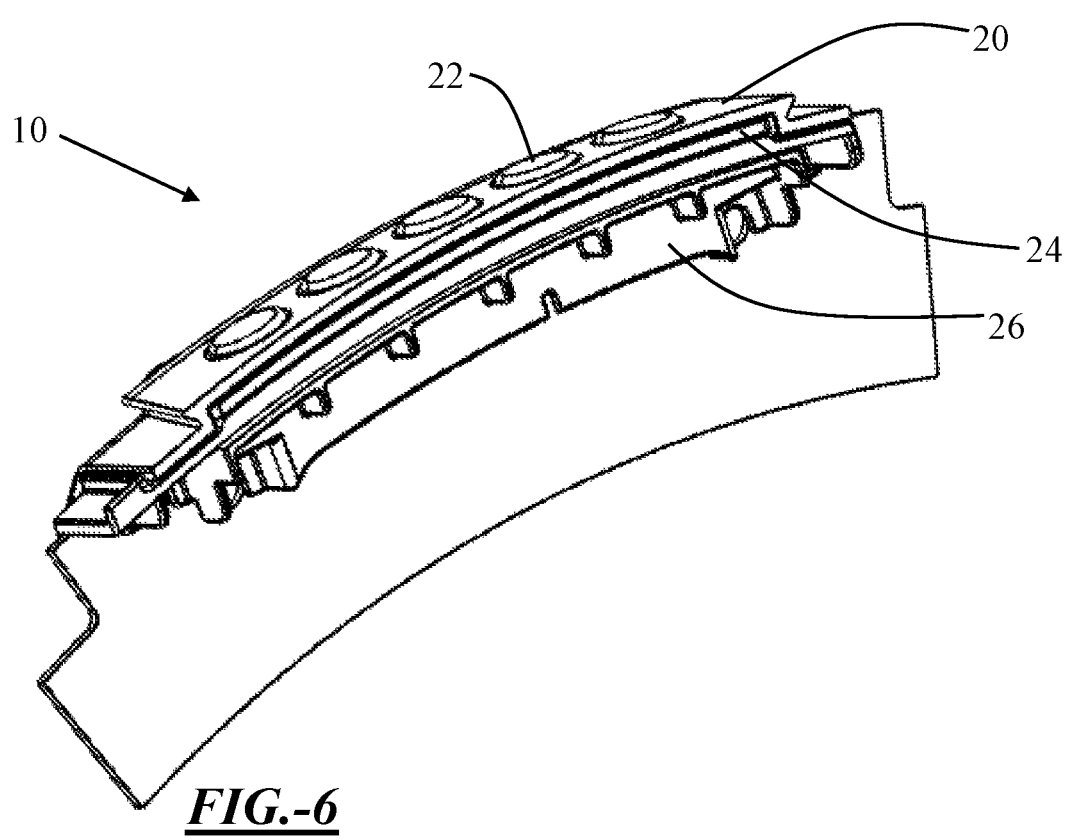
FIG. 6 is a rear perspective view of a user interface.

FIGS. 5 and 6 illustrate the user interface 10. The user interface 10 includes a trim cover 20. The trim cover 10 has shape reciprocal with the contours of the bezel 110 (not shown). The trim cover 20 houses a diffuser 18. The diffuser 18 may be located in an opening of the trim cover 20 and/or adjacent to a clear panel of the trim cover 20. The trim cover 20 includes a plurality of button openings 32. Through each button opening 32 is a button 22. Below the trim panel 12 is the button carrier 26. Held in between the trim cover 20 and the button carrier 26 is a button bar 24. The button bar 24 includes the plurality of buttons 22.

Figure 7:
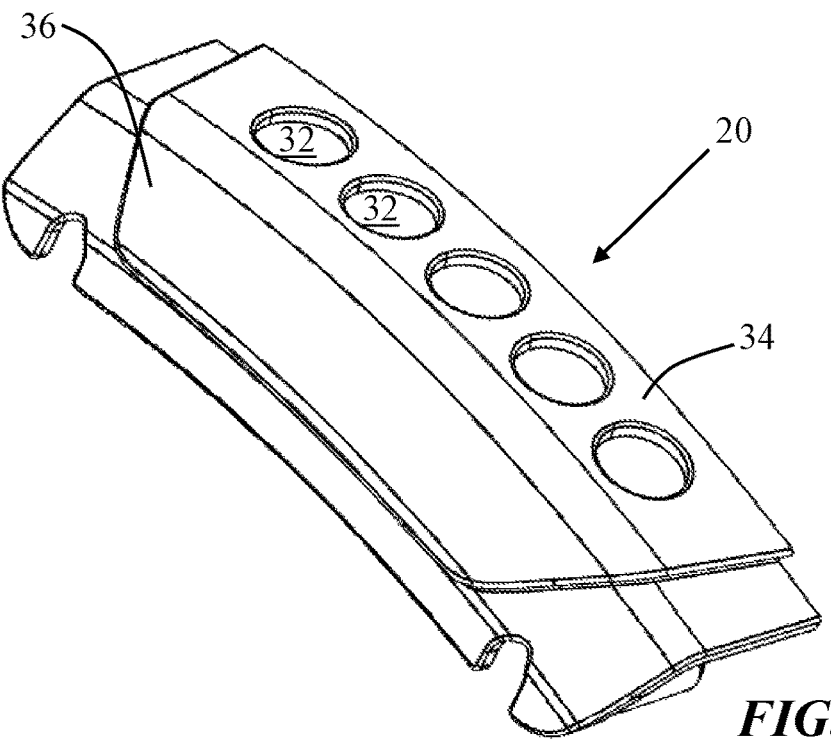
FIG. 7 is a front perspective view of a trim cover.
Figure 8:
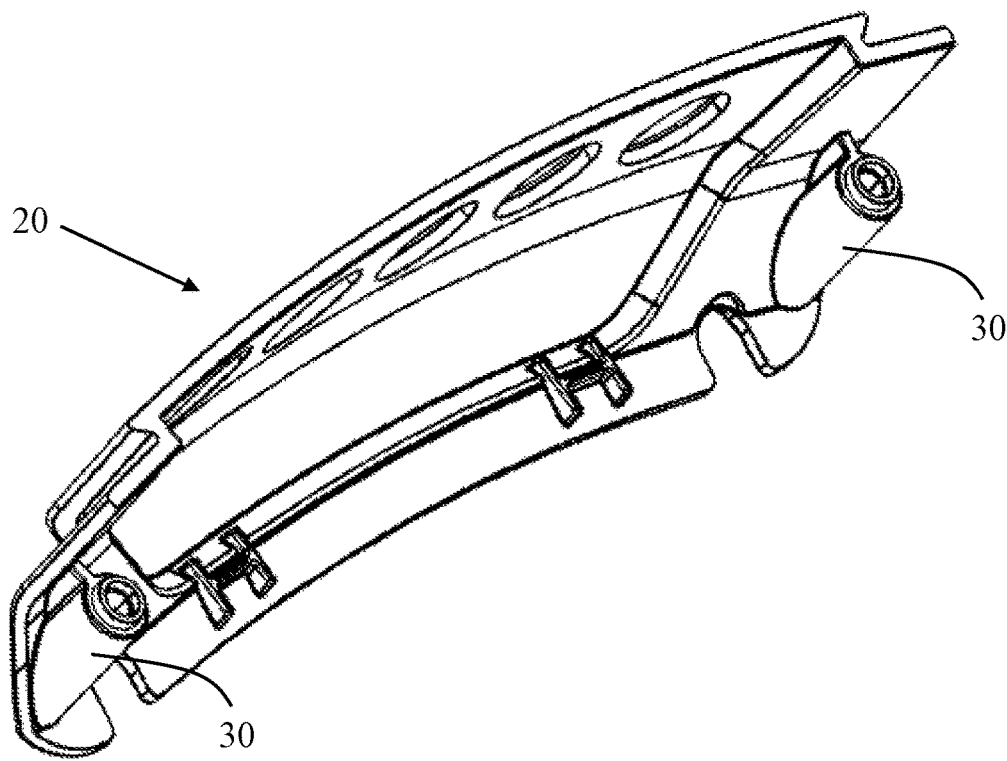
FIG. 8 is a rear perspective view of a trim cover.

FIGS. 7 and 8 illustrate the trim cover 20. The trim cover 20 includes an outer peripheral surface 34 and a forward-facing surface 36. The outer peripheral surface 34 is angled from the forward-facing surface 36 such as to be reciprocal with the contours of a bezel 110 (not shown). Both the outer peripheral surface 34 and the forward-facing surface 36 are curved. In this example, they are curved to match the generally circular shape of the bezel 110 (not shown). The forward-facing surface 36 may be transparent or include an opening therein, such as for a diffuser 18. The outer peripheral surface 34 includes a plurality of button openings 32. The trim cover 20 includes bosses 30.

Figure 9:
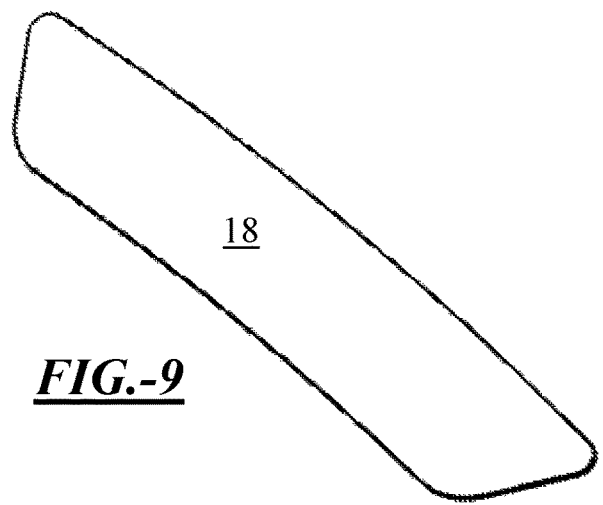
FIG. 9 is a front perspective view of a diffuser.

FIG. 9 illustrate a diffuser 18. The diffuser 18 has a shape substantially similar to a portion of a bezel 110 (not shown), a forward-facing surface 36 (not shown) of a trim cover 20 (not shown), or both. The diffuser 18 has an overall arcuate shape to be reciprocal and/or matching with a portion of a bezel's 110 (not shown) profile. A diffuser 18 may be partially or completely transparent, frosted, opaque, or any combination thereof.

Figure 10:
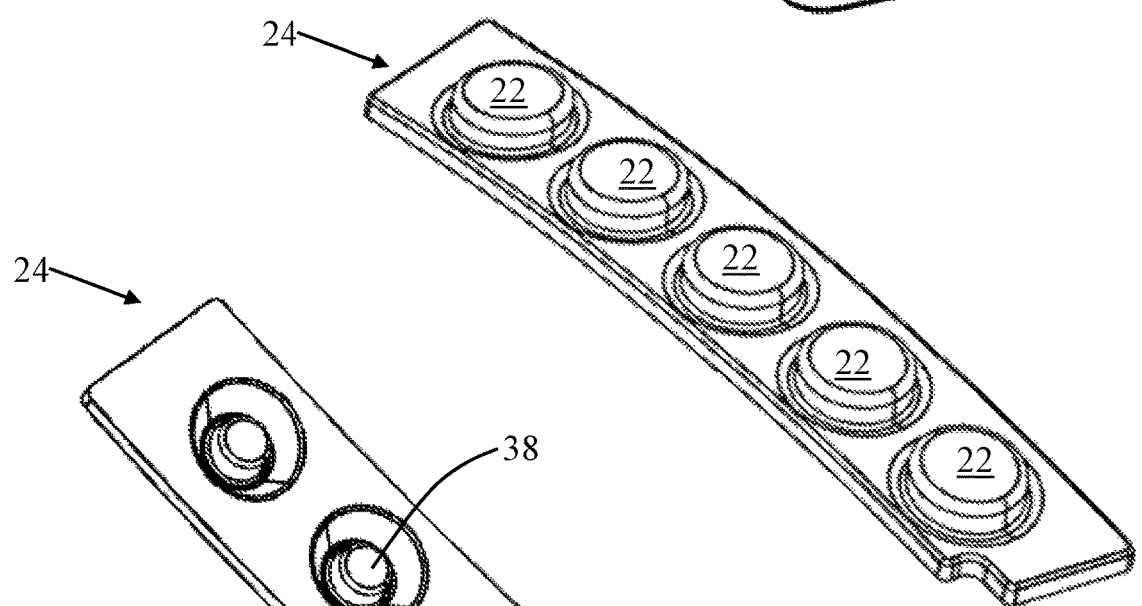
FIG. 10 is a top perspective view of a button bar.
Figure 11:
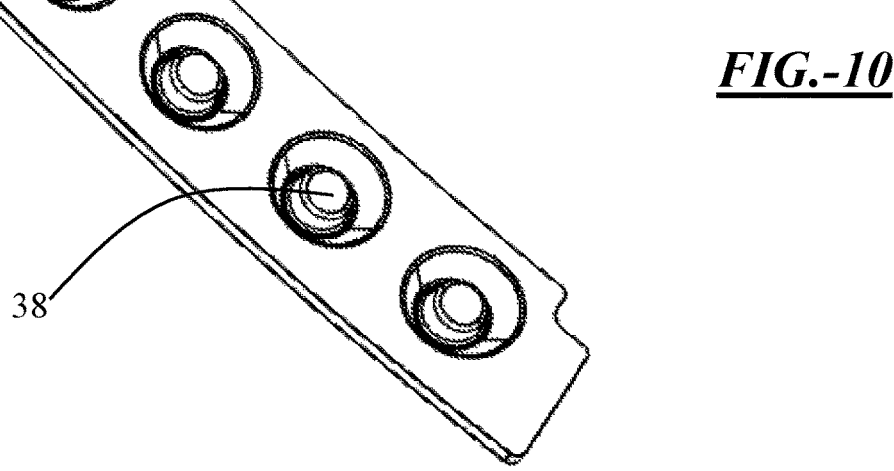
FIG. 11 is a bottom perspective view of a button bar.

FIGS. 10 and 11 illustrate a button bar 24. The button bar 24 includes a plurality of buttons 22. The buttons 22 may be integral with the bar 24 (e.g., made of the same material, molded therewith) or moveably affixed to the bar 24. The buttons 22 and bar 24 may be made of a flexible material (e.g., rubber, silicone) to allow movement of the buttons 22 relative to the bar 24 if made of the same material. The buttons 22 may include button contacts 38. The button contacts 38 may function to transfer force applied to an outer surface of a button. The button contacts 38 may trigger one or more electrical connections to be made and one or more actions to result.

Figures 12, 13:
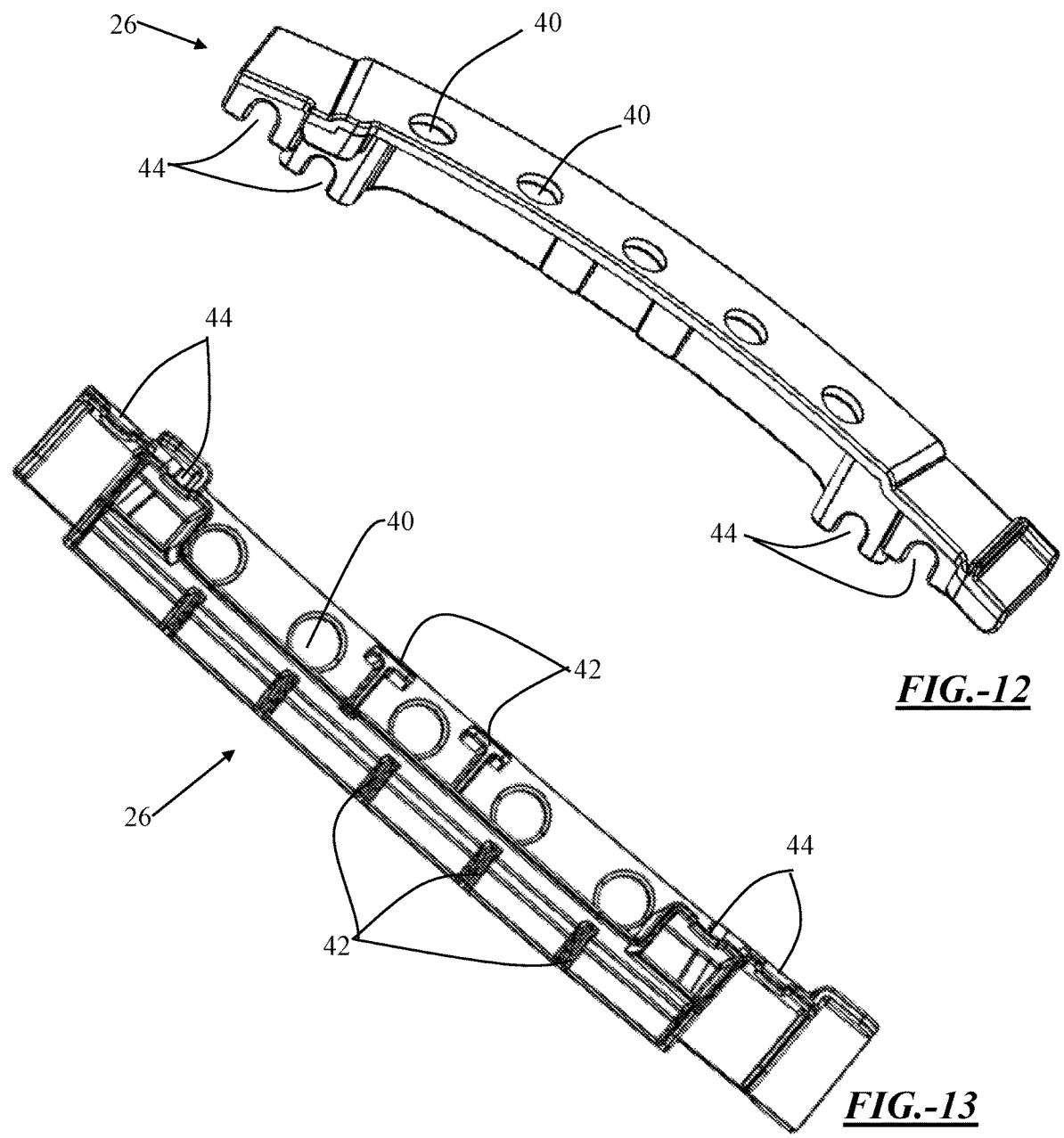
FIG. 12 is a top perspective view of a button carrier.
FIG. 13 is a bottom perspective view of a button carrier.

FIGS. 12 and 13 illustrate a button carrier 26. A button carrier 26 includes a plurality of button contact openings 40. The button contact openings 40 allow for the button contacts 38 (not shown) to move partially therethrough, such as when a button 22 (not shown) is depressed. The button carrier 26 includes a plurality of reinforcements 42. The reinforcements 42 may provide structural reinforcement, support, and even counterforce to the button bar 24. The button carrier 26 includes a plurality of mounting tabs 44. The mounting tabs 44 may align with one or more bosses 30 (not shown). The mounting tabs 44 may allow for one or more fasteners 28 (not shown) to pass partially therethrough and abut therewith to secure the button carrier 26. For example, the fasteners 28 may extend through the mounting tabs 44, through the circuit board 12 (not shown), and through bosses 30 (not shown) of the light guide 16 (not shown) and the trim cover 20 (not shown), securing all of the components together. Additionally, by being fastened to the trim cover 20 and the circuit board 12, the button carrier 26 is able to cooperate with the trim cover 20 to retain the button bar 24 sandwiched therebetween.

Figure 14:
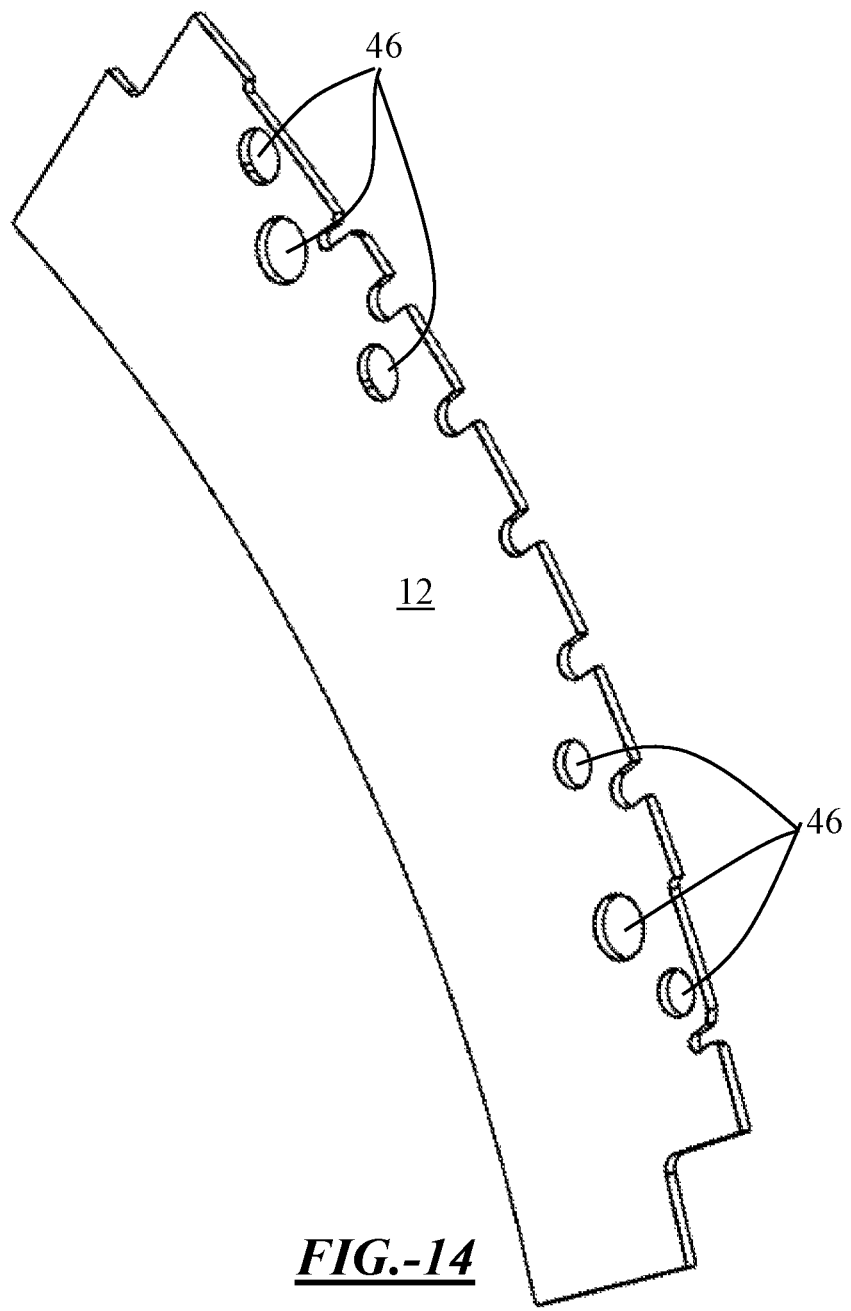
FIG. 14 is a front perspective view of a circuit board.
Figure 15:
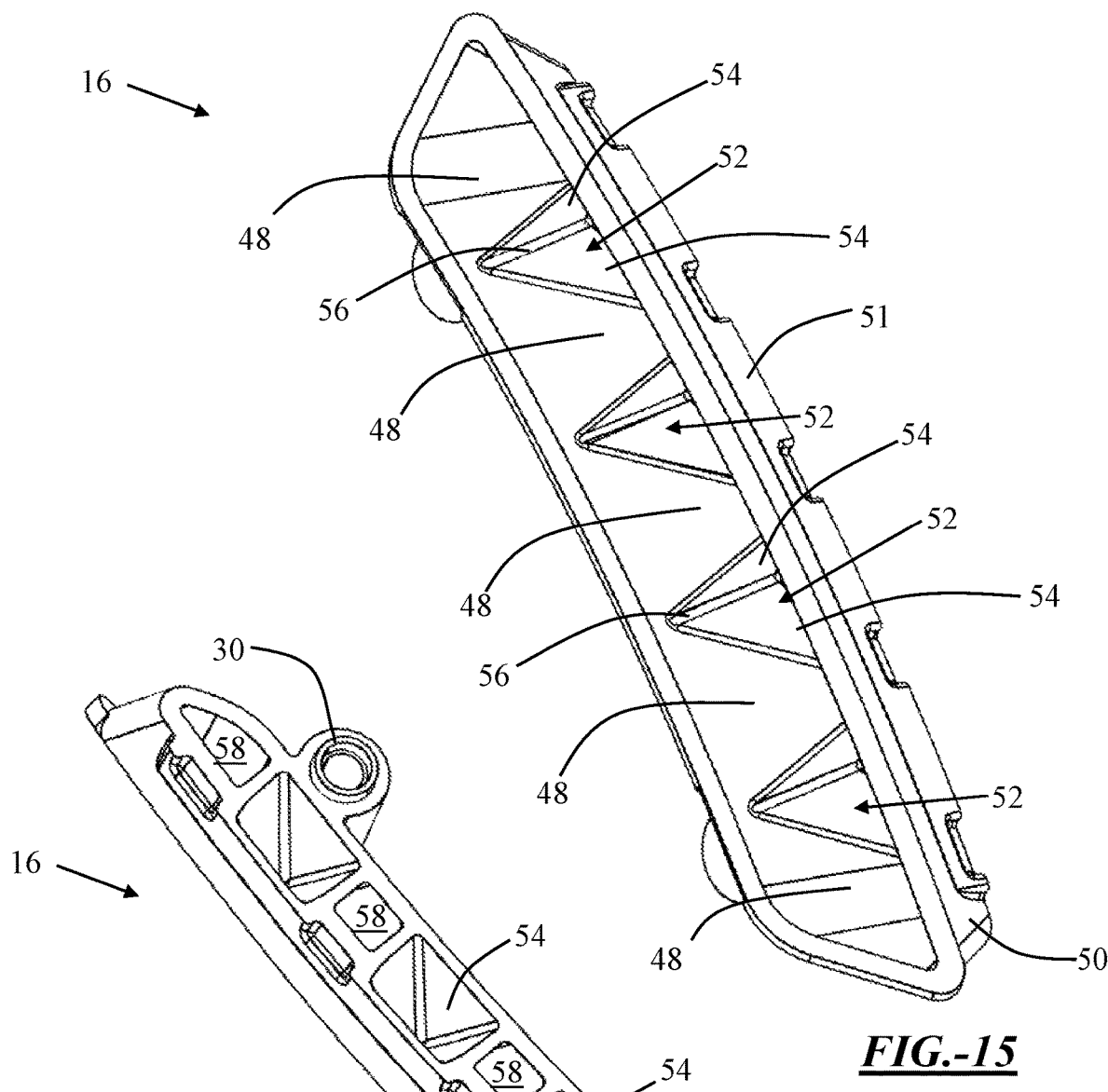
FIG. 15 is a front perspective view of a light guide.
Figure 16:
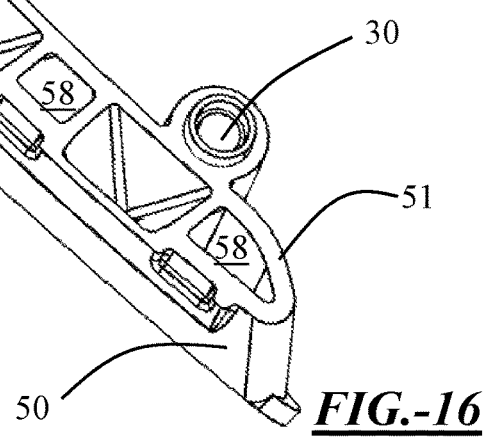
FIG. 16 is a rear perspective view of a light guide.
Figure 17:
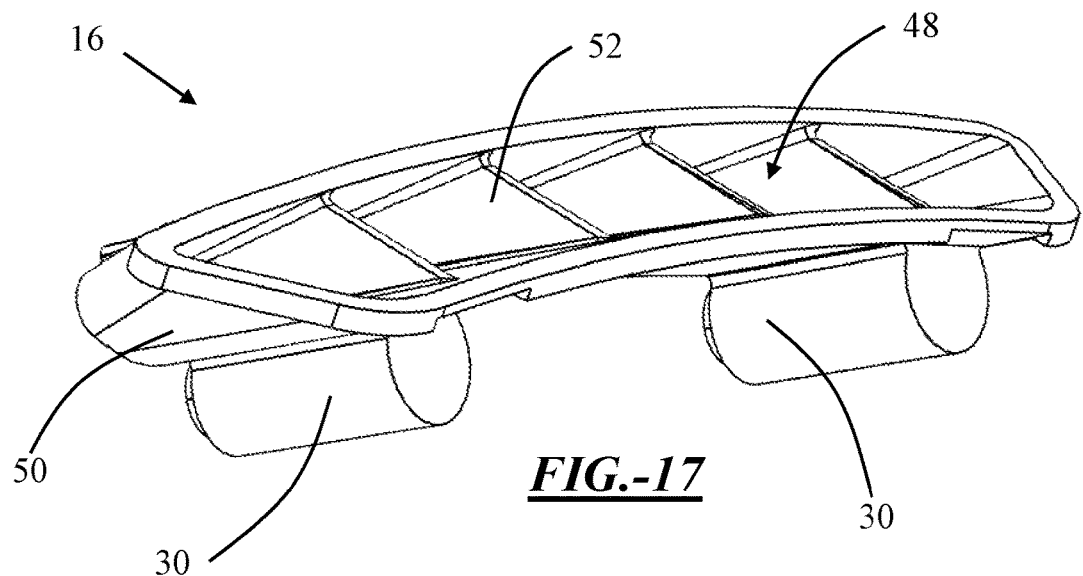
FIG. 17 is a front perspective view of a light guide.
Figure 18:
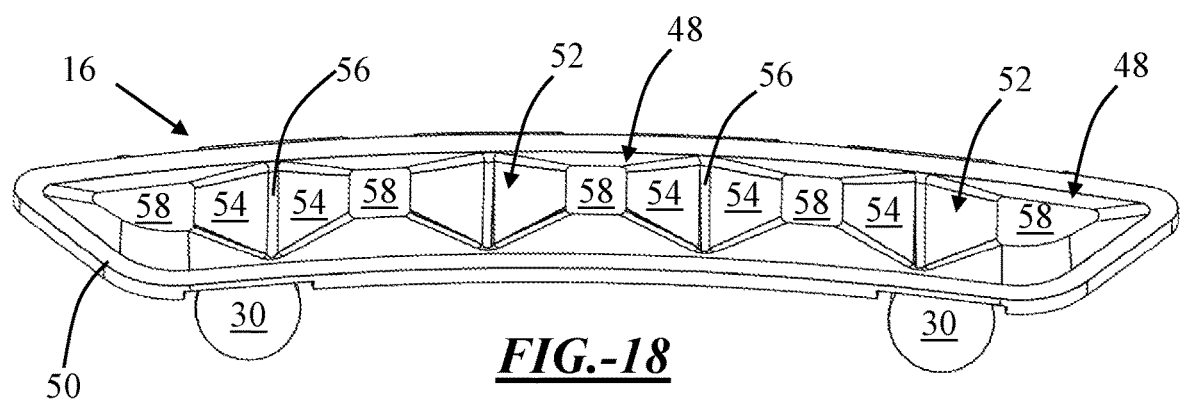
FIG. 18 is a front view of a light guide.

FIG. 14 illustrates a circuit board 12. The circuit board 12 may include a plurality of electrical circuits and components which allow a litter device to operate automatically. The circuit board 12 may include a plurality of light emitting devices 14 (not shown) affixed thereto. The light emitting devices 14 may be aligned with one or more light openings of a light guide 16. The circuit board 12 may have a shape reciprocal with a shape and/or interior area of a bezel 110 (not shown). The shape may allow for the circuit board 12 to reside within the bezel 110. The circuit board 12 may have an arcuate shape. The circuit board 12 includes a plurality of fastener openings 46. The fastener openings 46 may allow for one or more fasteners 28 (not shown) to pass therethrough and/or reside therein. The fastener openings 46 may allow for the circuit board 12 to be affixed to one or more other components of the user interface 10, bezel 110, or overall litter device 100. The fastener openings 46 may be aligned with one or more bosses 30 (not shown), mounting tabs 44 (not shown), or both.

FIGS. 15-18 illustrate a light guide 16. The light guide 16 includes an outer wall 50 and a rear wall 51. The light guide 16 includes a plurality of light pockets 48. The light pockets 48 are separated by guide walls 52. The guide walls 52 each include opposing guide surfaces 54 and an outer surface 56. The opposing guide surfaces 54 are angled toward and adjoin at the outer surface 56. The light guide 16 includes a plurality of light openings 58. The light openings 58 are formed in the rear wall 51. The light openings 58 are located in a rear of each light pocket 48. Each light opening 58 aligns with a light emitting device 14 (not shown). The guide surfaces 54 angle away from the light openings 58. The guide walls 52 are formed as indentations from the rear wall 51. The light guide 16 includes bosses 30.

Figure 19:
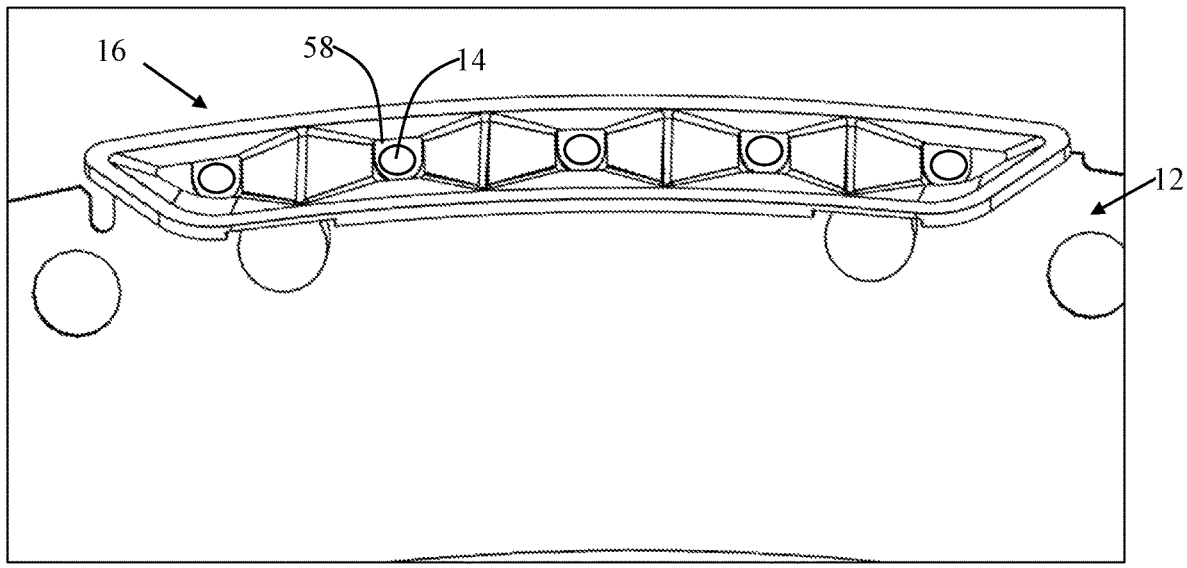
FIG. 19 is a front view of a light guide affixed to a circuit board.
Figure 20:
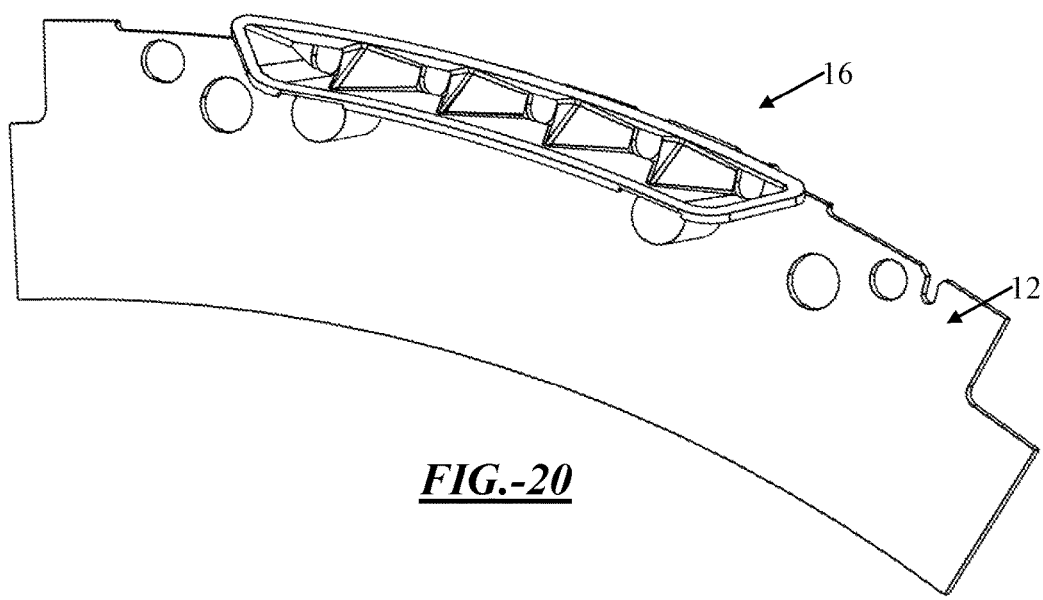
FIG. 20 is a front perspective view of a light guide affixed to a circuit board.

FIGS. 19 and 20 illustrate a light guide 16 affixed to a circuit board 12. The light guide 16 is aligned with a plurality of light emitting devices 14. Specifically, the light openings 58 are aligned with the light emitting devices 14.

Figure 21:
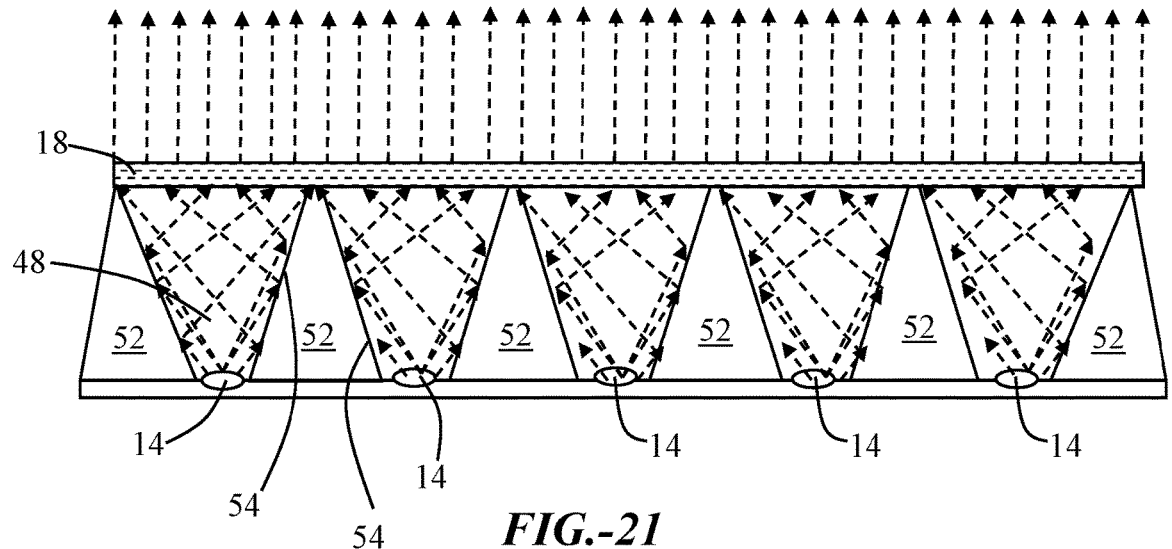
FIG. 21 is a cross-section view of light emitting through a light guide and diffuser.
Figure 22:
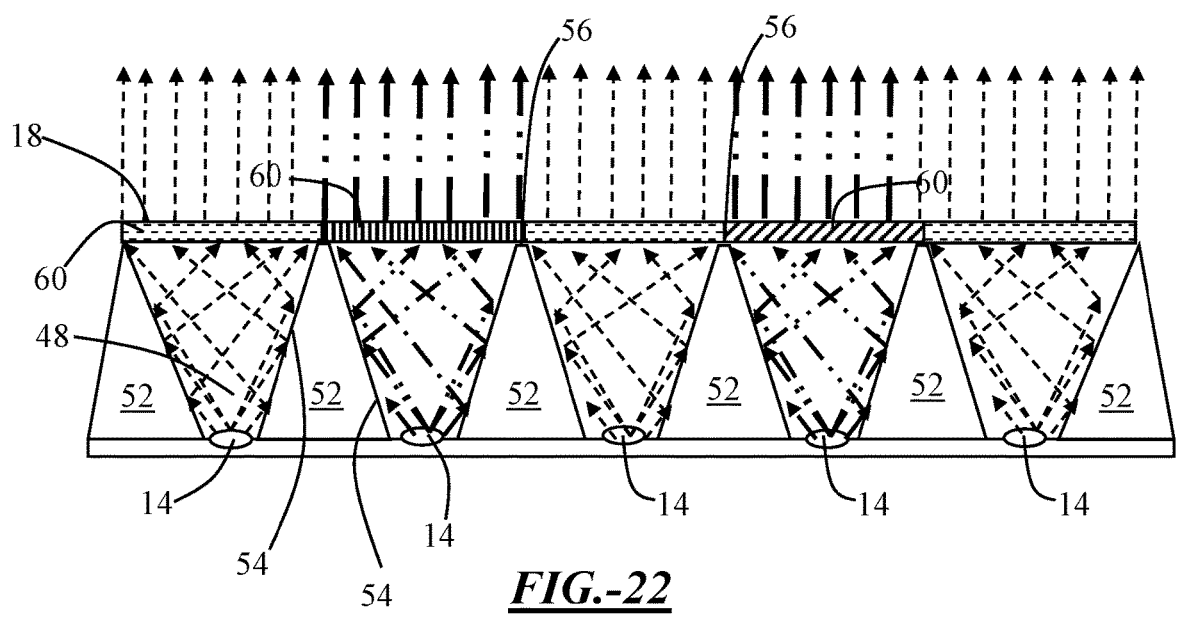
FIG. 22 is a cross-section view of light emitting through a light guide and diffuser.

FIGS. 21-23 illustrate the advantages of the light guide 16 and diffuser 18 configuration while FIGS. 24-25 illustrate the prior art.

As illustrated in FIG. 21, if all of the light emitting devices 14 are lit and emitting the same color, when the emitted light reaches the diffuser 18, the diffuser 18 provides the appearance of a single, continuous band of light. In other words, the diffuser 18 cooperates with the light emitting devices 14 and the light pockets 48 to create a uniform light spread, eliminate hot spots (high intensity directly above the light emitting device 14), and eliminate cool spots (low intensity between the light emitting devices 14).

Figure 26:
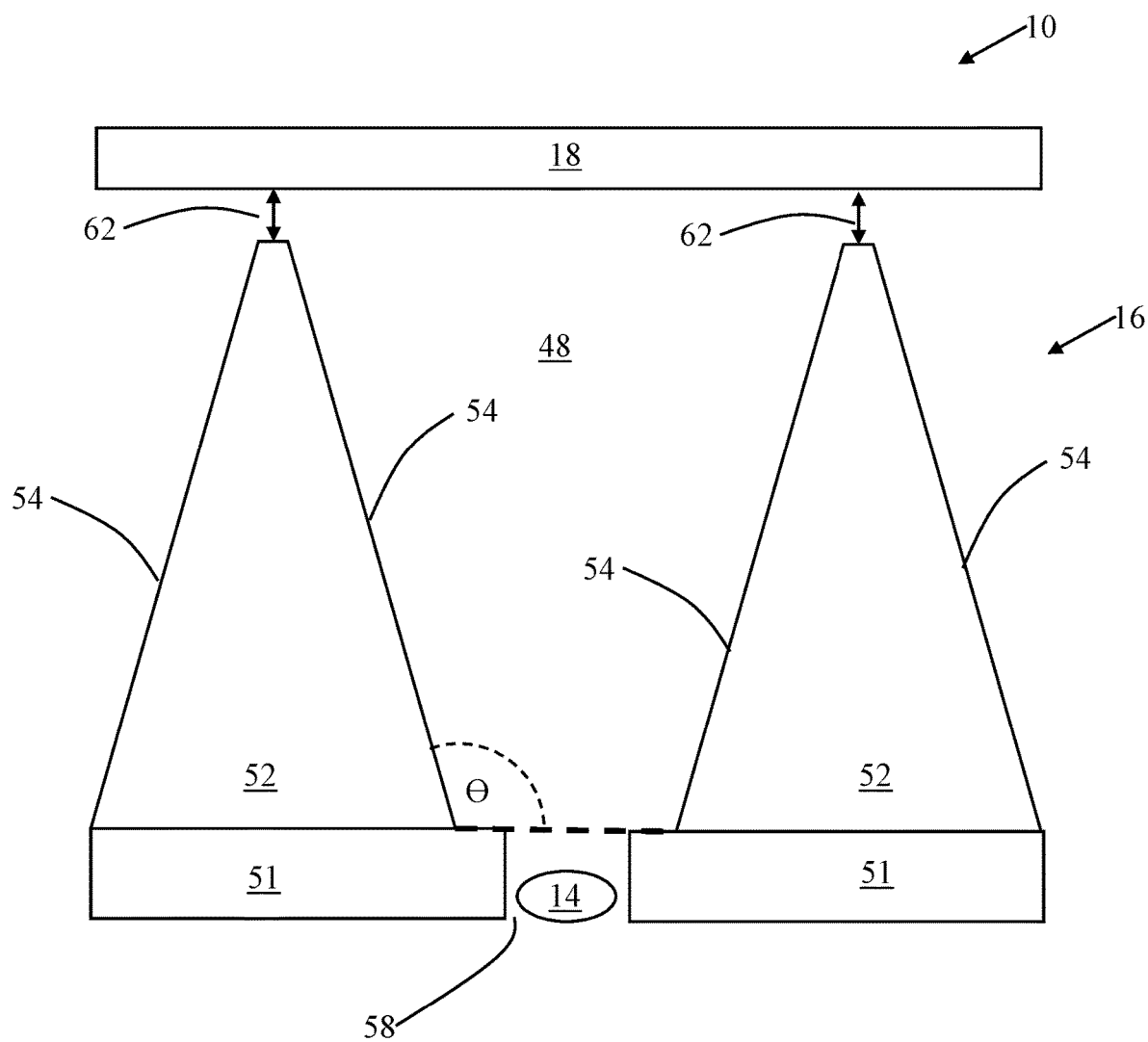
FIG. 26 illustrates a cross-section of a light guide, diffuser, and light emitting device of a user interface.

In FIG. 22, if the light emitting devices 14 are all lit but emitting differently colors, when the emitted light reaches the diffuser 18, the diffuser 18 and guide walls 52 cooperate together to create a uniform light spread for each light emitting device 14. With the aid of the guide surfaces 54, outer surface 56, gap 62 (such as shown in FIG. 26), and the diffuser 18, discrete light sections 60 are formed. Discrete may mean that the varying colors do not and/or minimally overlap with one another when emitted from the diffuser. Thus, each individual color segment appears as a discrete and well-defined lighting segment of the band of light without overlapping and/or blending with adjacent lighting segments.

In FIG. 23, if only some of the light emitting devices 14 are lit, the diffuser 18 and guide walls 52 cooperate together to create a uniform light spread for each light emitting device 14. With the aid of the guide surfaces 54 and outer surface 56, a discrete light section 60 is formed corresponding to the light emitting devices 14 which are actively emitting light. The remainder of the diffuser 18 remains opaque, frosted, or otherwise unlit.

FIGS. 24 and 25 illustrate challenges of diffusers 18 and light pockets 48 known in the prior art. Diffusers 18, when used with typical strips of light emitting devices 14, function to uniformly spread the light emitted from each light emitting device 14. This creates an overlap in emitted light to reduce cold spots and diffuses hot spots. While this may allow for the appearance of a continuous band of light, it does not allow for discrete light sections to be defined. In other words, if different colors are present, or different light emitting devices are turned off, the emitted rays overlap and blend with one another. Typical light pockets 48 also face a similar dilemma. The interior surface walls 54 of each pocket 48 may be configured to reflect the light and cause a more uniform spread. In doing so, the light pockets 48 create an overlap in emitted light such that discrete light portions cannot be defined.

FIG. 26 is a cross-section view of a portion of the user interface 10. Illustrated are the rear wall 51 and the guide walls 52 projecting from the rear wall 51 to form light pockets 48. The rear wall 51 includes a light opening 58. The light opening 58 is aligned with a light emitting device 14. Opposite the rear wall 51 is a diffuser 18. The diffuser 18 is distanced from the outer surface 56 of the guide walls 52. This distance is referred to as a gap 62. The guide walls 52 each include opposing guide surfaces 54. The guide surfaces 54 are angled away from the rear wall 51 at an angle Θ.

FIGS. 27-30C illustrate varying combinations and sequences the user interface 10 may be capable of displaying.

Figure 27:
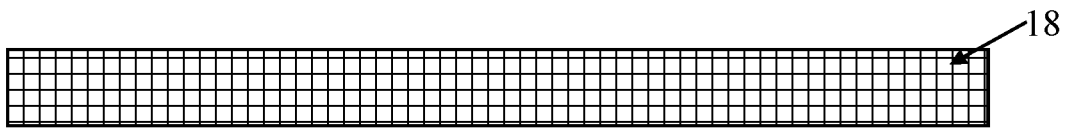
FIG. 27 illustrates a lighting scheme as it appears through a diffuser.
Figure 28A:
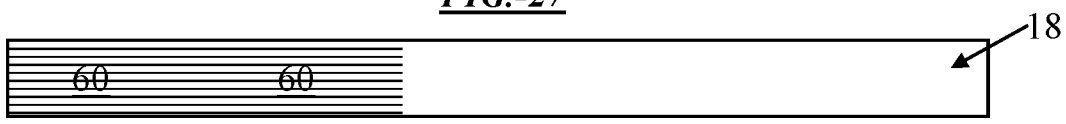
FIG. 28A-D illustrate a lighting sequence as it appears through a diffuser.
Figure 28B:
Figure 28C:
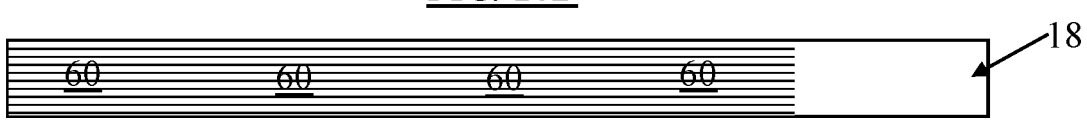
Figure 28D:
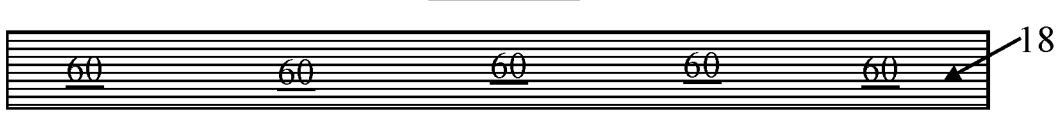

FIG. 27 illustrates a single, continuous band of light which is emitted through the diffuser 18. The light is shown as the color yellow, illustrated by a grid or cross-hatch pattern.

Figure 29:
FIG. 29 illustrates discrete lighting portions of different colors through a diffuser.

FIGS. 28A-28D illustrate a lighting sequence. In this sequence, individual discrete sections 60 are sequentially illuminated. As a discrete light section 60 is added, the illuminated portion appears as a single, continuous band of light while the adjacent portions remain unlit. This sequence may be useful in displaying a status, progress, or the like. The light is shown as the color blue, illustrated by a horizontal line pattern, FIG. 29 illustrates discrete light sections 60 emitting different colors of light. The discrete portions 60 include a first color discrete section 60a and a second color discrete section 60b. The discrete light sections 60 are defined at their edges such that there is no or minimal overlap in the emitted light and thus no blending of colors between the discrete light sections 60.

The First Color Discretet

Figure 30A:
FIGS. 30A-C illustrate a lighting sequence as it appears through a diffuser.
Figure 30B:
Figure 30C:

FIGS. 30A-30C illustrate a flashing sequence. In this sequence, some of the discrete light sections 60 are continuously illuminated. These are continuous discrete portions 60c. In this sequence, one or more discrete light sections 60 turn on and off, creating a flashing discrete section 60d. By having discrete light sections 60, the flashing discrete section 60d is well defined such that a user is able to easily perceive the flashing.

REFERENCE LISTING

10—User interface
12—Circuit board
14—Light emitting device
16—Light guide
18—Diffuser
20—Trim cover
22—Button
24—Button bar
26—Button carrier
28—Fastener
30—Boss
32—Button openings
34—Outer peripheral surface
36—Forward facing surface
38—Button contact
40—Button contact opening
42—Reinforcement
44—Mounting tab
46—Fastener opening
48—Light pockets
50—Outer wall
51—Rear wall
52—Guide wall
54—Guide surface
56—Outer surface
58—Light opening
60—Discrete light sections
60a—First color discrete section
60b—Second color discrete section
60c—Continuous discrete section
60d—Flashing discrete section
62—Gap
Θ—Angle
100—Litter device
102—Chamber
104—Base
106—Bonnet
108—Entry opening
110—Bezel Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A user interface comprising:
 a) one or more light guides, wherein each light guide includes:
  i) a rear wall extending a length of the each light guide;
  ii) an outer wall projecting from the rear wall and defining an outer periphery of the each light guide;
  iii) a plurality of guide walls, each guide wall having opposing guide surfaces angled away from the rear wall and an outer surface which adjoins the opposing guide surfaces and is located opposite the rear wall, wherein the plurality of guide walls of the each light guide are surrounded by the outer wall;
  iv) a plurality of light pockets, wherein each light pocket is defined as a space between a pair of guide walls, a guide wall and the outer wall, or any combination thereof;
  v) a plurality of light openings formed in the rear wall and located in a rear of the each light pocket;
 b) a plurality of light emitting devices, one or more light emitting devices residing within and/or aligned with the plurality of light pockets and the plurality of light openings;
 c) one or more diffusers located opposite the rear wall, the one or more diffusers distanced from the outer surface of the plurality of guide walls such as to create a gap free of other structures;
  wherein the opposing guide surfaces angle away from the rear wall at an angle of 100 degrees or greater to 130 degrees or less, wherein the angle is measured in the light pocket;
  wherein the gap has a height relative to a height of the plurality of guide walls, and wherein the height of the gap is smaller than the height of the plurality of guide walls; and
  wherein the height of the gap is about 1% or greater to about 25% or less than the height of the plurality of guide walls.

2. The user interface of claim 1, wherein the opposing guide surfaces angle away from the rear wall at the angle of about 100 degrees or greater to about 120 degrees or less.

3. The user interface of claim 1, wherein the one or more diffusers is transparent, opaque, frosted, or a combination thereof.

4. The user interface of claim 1, wherein the each light guide and the one or more diffusers are configured to display one or more continuous bands of light comprised of a plurality of discrete light sections and display one or more separate sections of light comprised of a plurality of light sections.

5. The user interface of claim 4, wherein light emitted from one light pocket does not and/or minimally overlaps with light emitted from an adjacent light pocket so as to provide for the plurality of discrete light sections.

6. The user interface of claim 1, wherein the one or more light emitting devices are one or more light emitting diodes.

7. The user interface of claim 1, wherein the opposing guide surfaces of the plurality of guide walls comprise one or more reflective materials, polished surfaces, are matte, or any combination thereof.

8. The user interface of claim 1, wherein the each light pocket has a three-dimensional shape which is shaped substantially similar to one or more cones, tetrahedrons, prisms, cubes, cuboids, cylinders, pyramids, or any combination thereof.

9. The user interface of claim 8, wherein the plurality of guide walls have a three-dimensional shape which is shaped substantially similar to a triangular prism, pyramid, cone, cube, cuboid, cylinder, or any combination thereof.

10. The user interface of claim 1, wherein the one or more diffusers has a two-dimensional shape which is partially or completely an annulus, square, rectangle, circle, oval, triangle, or any combination thereof.

11. The user interface of claim 1, wherein the user interface includes and/or is affixed to a circuit board; and
 wherein the one or more light emitting devices are affixed to, supported by, pass through, and/or reside within the circuit board.

12. The user interface of claim 1, wherein the user interface includes a trim cover;
 wherein the one or more diffusers is affixed to the trim cover; and
 wherein the one or more diffusers resides within an opening of the trim cover.

13. The user interface of claim 12, wherein the user interface includes one or more buttons; and
 wherein the one or more buttons pass through one or more button openings of the trim cover.

14. The user interface of claim 13, wherein the user interface is integrated into one or more consumer products; and
 wherein the one or more consumer products include one or more smart home devices, pet care devices, communication devices, vehicles, or any combination thereof.

15. The user interface of claim 14, wherein the one or more consumer products is a litter device; and
 wherein the user interface is affixed to and/or integrated into an exterior of the litter device.

16. A user interface comprising:
 a) one or more light guides, wherein each light guide includes:
  i) a rear wall extending a length of the each light guide;
  ii) an outer wall projecting from the rear wall and defining an outer periphery of the each light guide;
  iii) a plurality of guide walls, each guide wall having opposing guide surfaces angled away from the rear wall and an outer surface which adjoins the opposing guide surfaces and is located opposite the rear wall, wherein the opposing guide surfaces angle away from the rear wall at an angle of 100 degrees or greater to 130 degrees or less, and wherein the plurality of guide walls of the each light guide are surrounded by the outer wall;
  iv) a plurality of light pockets, wherein each light pocket is defined as a space between a pair of guide walls, a guide wall and the outer wall, or any combination thereof, and wherein the angle that the opposing guide surfaces angle away from the rear wall is measured in the light pocket;
  v) a plurality of light openings formed in the rear wall and located in a rear of the each light pocket;
 b) a plurality of light emitting devices, one or more light emitting devices residing within and/or aligned with the plurality of light pockets and the plurality of light openings; and
 c) one or more diffusers located opposite the rear wall, the one or more diffusers distanced from the outer surface of the plurality of guide walls such as to create a gap free of other structures;
  wherein the light guide and the one or more diffusers are configured to display one or more continuous bands of light comprised of a plurality of discrete light sections and one or more separate sections of light comprised of a plurality of light sections;

wherein light emitted from one light pocket does not and/or minimally overlaps with the light emitted from an adjacent light pocket so as to provide for the plurality of discrete light sections;

wherein the gap has a height relative to a height of the plurality of guide walls, and wherein the height of the gap is smaller than the height of the plurality of guide walls; and wherein the height of the gap is about 1% or greater to about 25% or less than the height of the plurality of guide walls.

17. The user interface of claim 16, wherein the opposing guide surfaces angle away from the rear wall at the angle of about 100 degrees or greater to about 120 degrees or less.

18. The user interface of claim 17, wherein the user interface includes a trim cover, the one or more diffusers is affixed to the trim cover, and the one or more diffusers resides with an opening of the trim cover; and wherein the user interface includes one or more buttons which pass through one or more openings of the trim cover.

19. The user interface of claim 16, wherein the user interface is integrated into a litter device;

wherein the user interface is affixed to a housing, an exterior, or both of the litter device; and wherein the user interface is affixed to a bezel of the litter device located about an entry opening of the litter device.

20. A user interface comprising:
a) one or more light guides, wherein each light guide includes:
  i) a rear wall extending a length of the each light guide;
  ii) an outer wall projecting from the rear wall and defining an outer periphery of the each light guide;
  iii) a plurality of guide walls, each guide wall having opposing guide surfaces angled away from the rear wall and an outer surface which adjoins the opposing guide surfaces and is located opposite the rear wall, wherein the opposing guide surfaces angle away from the rear wall at an angle of 100 degrees or greater to 130 degrees or less, wherein the plurality of guide walls each include the outer surface and the outer surface adjoins each of the opposing guide surfaces, and wherein the plurality of guide walls of the each light guide are surrounded by the outer wall;
  iv) a plurality of light pockets, wherein each light pocket is defined as a space between a pair of guide walls, a guide wall and the outer wall, or any combination thereof, and wherein the angle that the opposing guide surfaces angle away from the rear wall is measured in the light pocket;
  v) a plurality of light openings formed in the rear wall and located in a rear of the each light pocket;
b) a plurality of light emitting devices, one or more light emitting devices residing within and/or aligned with the plurality of light pockets and the plurality of light openings; and
c) one or more diffusers located opposite the rear wall, the one or more diffusers distanced from the outer surface of the plurality of guide walls such as to create a gap free of other structures;

wherein the light guide and the one or more diffusers are configured to display one or more continuous bands of light comprised of a plurality of discrete light sections and one or more separate sections of light comprised of a plurality of light sections;

wherein light emitted from one light pocket does not and/or minimally overlaps with the light emitted from an adjacent light pocket so as to provide for the plurality of discrete light sections;

wherein the gap has a height relative to a height of the plurality of guide walls, and wherein the height of the gap is smaller than the height of the plurality of guide walls;

wherein the height of the gap is about 1% or greater to about 25% or less than the height of the plurality of guide walls; and wherein the user interface is integrated into a litter device such that it is affixed to a housing, an exterior, or both of the litter device.

* * * * *